US011822893B2

(12) United States Patent
Veyseh et al.

(10) Patent No.: US 11,822,893 B2
(45) Date of Patent: Nov. 21, 2023

(54) MACHINE LEARNING MODELS FOR DETECTING TOPIC DIVERGENT DIGITAL VIDEOS

(71) Applicant: Adobe Inc., San Jose, CA (US)

(72) Inventors: Amir Pouran Ben Veyseh, Eugene, OR (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 221 days.

(21) Appl. No.: 17/391,866

(22) Filed: Aug. 2, 2021

(65) Prior Publication Data
US 2023/0046248 A1    Feb. 16, 2023

(51) Int. Cl.
  *G06N 3/04*      (2023.01)
  *G06F 40/35*     (2020.01)
  *G06F 40/237*    (2020.01)
  *G06F 40/205*    (2020.01)

(52) U.S. Cl.
  CPC ........... *G06F 40/35* (2020.01); *G06F 40/205* (2020.01); *G06F 40/237* (2020.01); *G06N 3/04* (2013.01)

(58) Field of Classification Search
  CPC ...... G06F 40/35; G06F 40/237; G06F 40/205; G06N 3/04
  See application file for complete search history.

(56) References Cited

U.S. PATENT DOCUMENTS

| 8,589,487 | B1* | 11/2013 | Reeves ............... H04L 65/403 |
| | | | 709/204 |
| 8,886,648 | B1* | 11/2014 | Procopio ............... G06F 16/93 |
| | | | 707/737 |
| 2020/0175961 | A1* | 6/2020 | Thomson ............... G10L 15/28 |
| 2021/0374338 | A1* | 12/2021 | Shrivastava ........... G06F 40/30 |
| 2022/0277147 | A1* | 9/2022 | Nguyen ................. G06F 40/42 |

(Continued)

OTHER PUBLICATIONS

Tran, D., Wang, H., Torresani, L. & Feiszli, M. Video classification with channel-separated convolutional networks. In Proceedings of the IEEE/CVF International Conference on Computer Vision, 5552-5561 (2019).

(Continued)

*Primary Examiner* — Sonia L Gay
(74) *Attorney, Agent, or Firm* — Keller Preece PLLC

(57) ABSTRACT

The present disclosure relates to systems, methods, and non-transitory computer readable media for accurately and flexibly generating topic divergence classifications for digital videos based on words from the digital videos and further based on a digital text corpus representing a target topic. Particularly, the disclosed systems utilize a topic-specific knowledge encoder neural network to generate a topic divergence classification for a digital video to indicate whether or not the digital video diverges from a target topic. In some embodiments, the disclosed systems determine topic divergence classifications contemporaneously in real time for livestream digital videos or for stored digital videos (e.g., digital video tutorials). For instance, to generate a topic divergence classification, the disclosed systems generate and compare contextualized feature vectors from digital videos with corpus embeddings from a digital text corpus representing a target topic utilizing a topic-specific knowledge encoder neural network.

20 Claims, 16 Drawing Sheets

(56) References Cited

U.S. PATENT DOCUMENTS

2022/0292265 A1* 9/2022 Guo ................ G06F 40/194
2022/0374598 A1* 11/2022 Osuala .............. G06N 3/0455

OTHER PUBLICATIONS

Dessi, D., Fenu, G., Marras, M. & Recupero, D. R. Bridging learning analytics and cognitive computing for big data classification in micro-learning video collections. Comput. Hum. Behav. 92, 468-477 (2019).

* cited by examiner

MACHINE LEARNING MODELS FOR DETECTING TOPIC DIVERGENT DIGITAL VIDEOS

BACKGROUND

In the field of digital video classification, conventional video analysis systems are able to determine various classifications for content depicted within digital videos. For example, some conventional video analysis systems analyze visual content of a digital video to determine classifications for the digital video based on the visual content. Other conventional video analysis systems analyze verbal content of a digital video to determine a classification indicating the subject matter of the digital video. Despite these advances, however, many conventional video analysis systems suffer from multiple drawbacks and disadvantages, particularly in their accuracy, efficiency, and flexibility.

SUMMARY

This disclosure describes one or more embodiments of systems, methods, and non-transitory computer readable media that solve one or more of the foregoing or other problems in the art with a machine learning approach for generating topic divergence classifications for digital videos based on words from the digital videos and further based on a digital text corpus representing a target topic. In particular, in one or more embodiments the disclosed systems utilize a topic-specific knowledge encoder neural network to generate a topic divergence classification for a digital video to indicate whether or not the digital video diverges from a target topic (e.g., a target topic selected or otherwise indicated via a client device). For instance, the disclosed systems compare words from the digital video with a topic-specific digital text corpus to automatically detect content that is not related to the target topic of the digital text corpus. In some embodiments, the disclosed systems determine topic divergence classifications contemporaneously in real time for livestream digital videos or for stored digital videos, such as digital tutorial videos. By utilizing the topic-specific knowledge encoder neural network the disclosed systems can utilize a deep learning model to accurately identify off-topic, chitchat digital videos while flexibly and efficiently incorporating domain-specific knowledge into the deep model.

Moreover, in some embodiments, the disclosed systems perform data augmentation to augment or modify training data to train or tune the topic-specific knowledge encoder neural network. For example, the disclosed systems generate synthetic digital video transcripts and/or hybrid digital video transcripts to use as training data for learning parameters of the topic-specific knowledge encoder neural network. In some cases, the disclosed systems generate synthetic transcripts similar to transcripts of digital videos already identified as topic divergent utilizing a generative language model. In these or other cases, the disclosed systems utilize a mix-up technique to generate hybrid transcripts by replacing sentences within transcripts of topic divergent videos with sentences from transcripts of topic conforming videos. By utilizing synthetic transcripts and/or hybrid transcripts as part of a training dataset, the disclosed systems efficiently learn robust parameters for a topic-specific knowledge encoder neural network that result in accurate predictions of topic divergence classifications.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
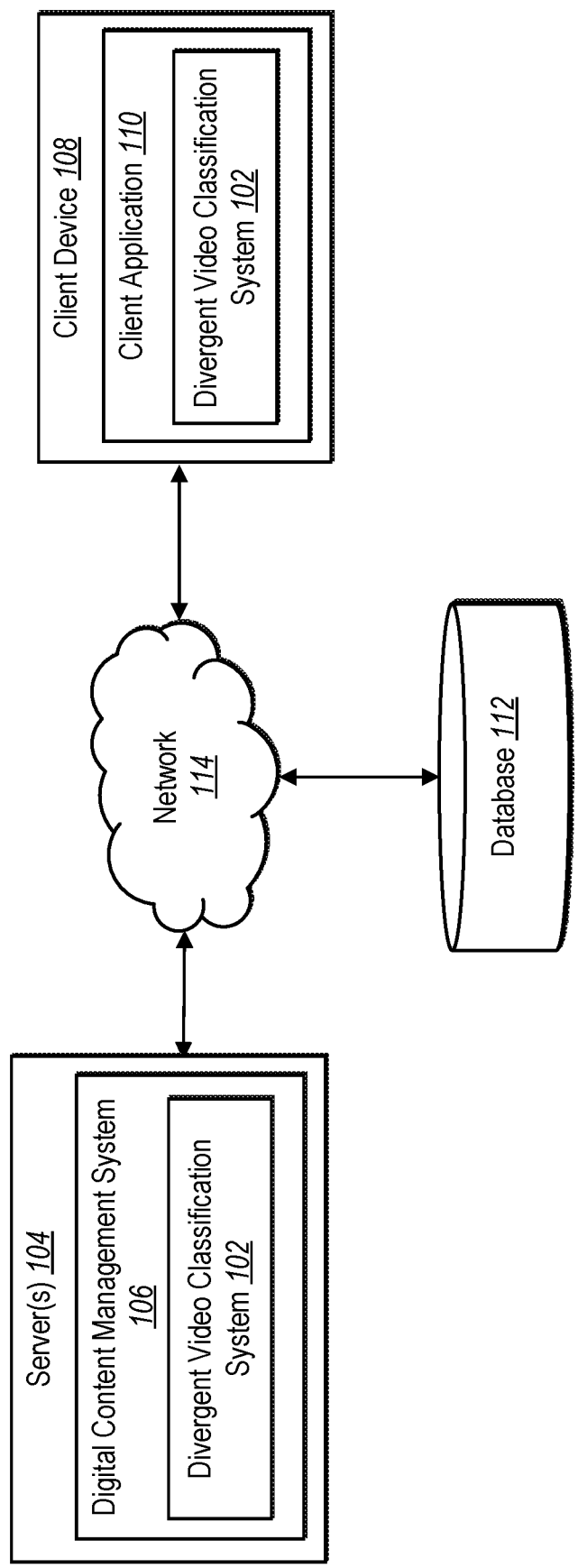
FIG. 1 illustrates an example system environment in which a divergent video classification system operates in accordance with one or more embodiments.

This disclosure describes one or more embodiments of a divergent video classification system that accurately generates topic divergence classifications for digital videos utilizing a topic-specific knowledge encoder neural network. In particular, in some embodiments, the divergent video classification system generates topic divergence classifications by determining relationships between words of digital videos and words of a digital text corpus representing a target topic. In some cases, the divergent video classification system receives client device interaction indicating a target topic from a search query (or from a selection of a digital video relating to a particular topic or from a topic selection from a menu of potential target topics). In some embodiments, the divergent video classification system additionally generates, collects, or identifies a digital text corpus that defines or represents the target topic (e.g., digital video tutorials on the indicated target topic, tool names relating to the target topic from a tool gazetteer, and/or keywords from an ontology relating to the target topic). In these or other embodiments, the divergent video classification system also generates topic-specific feature vectors that represent how individual words used in a digital video (e.g., a digital video surfaced as part of a search result) relate to the target topic of the digital text corpus. From the topic-specific feature vectors, in some cases, the divergent video classification system further utilizes the topic-specific knowledge encoder neural network to generate a topic divergence classification.

As just mentioned, in one or more embodiments, the divergent video classification system generates topic divergence classifications for digital videos. For example, a topic divergence classification indicates whether a digital video diverges from, or conforms to, a target topic. In some cases, the divergent video classification system generates one of two possible topic divergence classifications: topic divergent or topic conforming. In some embodiments, to generate a topic divergence classification for a digital video, the divergent video classification system analyzes words of a digital video (e.g., a digital video surfaced as part of a search result) as well as words of a digital text corpus associated with a target topic. In some cases, the divergent video classification system generates a topic-specific feature vector for each word of the digital video and orders the topic-specific feature vector in a sequence defined by the sequence of the words of the digital video. In some embodiments, a topic-specific feature vector represents a relationship between a respective word from the digital video and the target topic of the digital text corpus. Indeed, a digital text corpus sometimes includes a set of tutorials for a target topic indicated via client device interaction (e.g., tutorials for digital image editing or for using a particular image editing tool) as well as a tool gazetteer indicating names of various (topic-specific) tools associated with a digital content editing application and/or keywords from a topic ontology (e.g., a set of keywords associated with a particular target topic maintained by a digital content management system).

In certain embodiments, the divergent video classification system generates topic-specific feature vectors as a combination of video-related components and corpus-related components (e.g., to include features from both the digital video and the digital text corpus). For example, the divergent video classification system generates contextualized feature vectors from words of a digital video, where the contextualized feature vectors represent word meanings in the context of where the words occur in the digital video. In some cases, the divergent video classification system also generates or extracts corpus embeddings from words of the digital text corpus, where the corpus embeddings represent meanings of words within the digital text corpus (e.g., based on n-grams extracted for the words of the digital text corpus).

In certain embodiments, the divergent video classification system further compares the contextualized feature vectors and the corpus embeddings to establish or determine how the words of the digital video relate to the target topic of the digital text corpus. Based on the comparison, in some cases, the divergent video classification system selects, for each word of the digital video, a subset of the corpus embeddings as topic-specific embeddings representing a relationship between the respective word and the target topic. In certain implementations, the divergent video classification system further generates topic-specific feature vectors from the topic-specific embeddings by utilizing a long short-term memory ("LSTM") layer of a topic-specific knowledge encoder neural network. Thus, in some embodiments, the topic-specific feature vectors represent contextualized topic-related knowledge for the words of the digital video, accounting for the sequence in which the words occur in the digital video.

In one or more implementations, the divergent video classification system utilizes the topic-specific feature vectors to generate a topic divergence classification for a digital video. For example, the divergent video classification system combines (e.g., concatenates) contextualized feature vectors (for the words of the digital video) with topic-specific feature vectors. Additionally, in some embodiments, the divergent video classification system utilizes a feed-forward layer of the topic-specific knowledge encoder neural network to generate word feature vectors from the concatenated vectors. In some cases, the word feature vectors represent a complete set of video-related features as well as topic-related features for each word of the digital video.

In some embodiments, the divergent video classification system further generates a topic divergence classification from the word feature vectors of each word. For example, the divergent video classification system applies a max-pooling layer to the word feature vectors and utilizes a feed-forward layer of the topic-specific knowledge encoder neural network to generate a topic divergence classification from the pooled word feature vectors. In some cases, the divergent video classification system generates the topic divergence classification in the form of a probability distribution across the word feature vectors corresponding to the words of the digital video.

As mentioned above, in one or more embodiments, the divergent video classification system generates a customized or modified dataset (unique from datasets used by conventional systems) for training or tuning a topic-specific knowledge encoder neural network. For example, the divergent video classification system generates synthetic digital video transcripts and/or hybrid digital video transcripts to include within a training dataset. In certain implementations, the divergent video classification system utilizes synthetic transcripts and/or hybrid transcripts within an augmented or modified training dataset. Indeed, in some cases, the divergent video classification system learns parameters for a topic-specific knowledge encoder neural network from the augmented or modified training dataset.

In some embodiments, the divergent video classification system generates a synthetic transcript by utilizing a generative language model pretrained on an original dataset of digital videos (e.g., topic divergent digital videos and topic conforming digital videos). Indeed, in some cases, the divergent video classification system trains or tunes a generative language model to generate synthetic transcripts that resemble or are similar to known topic divergent digital videos. For instance, the divergent video classification system generates synthetic transcripts by utilizing the generative language model to predict words belonging at particular time steps within a digital video (or within the synthetic transcript).

In one or more embodiments, the divergent video classification system also (or alternatively) generates hybrid transcripts. For example, the divergent video classification system generates a hybrid transcript by combining sentences of a topic divergent transcript with sentences from a topic conforming transcript. In some cases, the divergent video classification system replaces a percentage of sentences within a topic divergent transcript with sentences from a topic conforming transcript (or vice-versa). Utilizing the hybrid transcripts and/or the synthetic transcripts, the divergent video classification system learns parameters for a topic-specific knowledge encoder neural network via a training or tuning process.

As suggested above, conventional video analysis systems exhibit a number of drawbacks or deficiencies. For example, many conventional video analysis systems inaccurately and inefficiently generate classifications for digital videos. Indeed, the accuracy of conventional systems is limited by the available data for training neural networks or other machine learning models. Unfortunately, existing datasets are not very robust and include little to no information regarding topic relatedness (e.g., whether or digital video is topic divergent or topic conforming). As a result of training models using the poor available data (or inefficiently collecting data), existing systems classify digital videos with a high degree of inaccuracy and a low degree of confidence.

Contributing to their inaccuracy in classifying digital videos, many existing digital video analysis systems are also inflexible. To elaborate, many conventional systems are rigidly fixed to existing datasets to train models for classifying digital videos. Additionally, existing systems utilize models that are often limited to generating classifications based on video data alone, without considering other related data that could otherwise inform the classification. Indeed, many existing systems do not generate or utilize a digital text corpus that defines or represents a target topic as a baseline for generating topic divergence classifications.

The divergent video classification system can provide a variety of improvements or advantages over conventional video analysis systems. For example, one or more embodiments of the divergent video classification system improve efficiency and accuracy over conventional systems. To elaborate, compared to conventional systems, the divergent video classification system can more accurately generate topic divergence classifications for digital videos. Specifically, by generating and utilizing more robust, customized training data including synthetic transcripts and/or hybrid transcripts, the divergent video classification system efficiently learns parameters for a topic-specific knowledge encoder neural network that generates more accurate topic divergence classifications. Further contributing to the improved accuracy of the divergent video classification system, the topic-specific knowledge encoder neural network has a unique architecture which facilitates generating highly accurate topic divergence classifications for digital videos.

As a further advantage over conventional systems, embodiments of the divergent video classification system flexibly incorporate topic-related information that existing systems either ignore or are incapable of leveraging. To elaborate, unlike some conventional systems that generate classifications for digital videos based solely on video information alone, embodiments of the divergent video classification system utilize a digital text corpus that defines or represents a target topic to guide the topic divergence classifications. For instance, the divergent video classification system utilizes the digital text corpus as a baseline for comparing against the digital video to determine relatedness of the digital video to the target topic of the digital text corpus.

Additionally, the divergent video classification system is able to perform certain functions not found in existing systems. For example, existing systems generally classify digital videos to indicate types of (e.g., labels for) visual content depicted within the videos and/or types of (e.g., labels for) verbal content expressed in the videos. By contrast, embodiments of the divergent video classification system generate topic divergence classifications which indicate a relatedness of a digital video with respect to a target topic, a function not found in prior systems. Indeed, as described, the divergent video classification system utilizes a topic-specific knowledge encoder neural network to generate topic divergence classifications.

Additional detail regarding the divergent video classification system will now be provided with reference to the figures. For example, FIG. 1 illustrates a schematic diagram of an example system environment for implementing a divergent video classification system 102 in accordance with one or more embodiments. An overview of the divergent video classification system 102 is described in relation to FIG. 1. Thereafter, a more detailed description of the components and processes of the divergent video classification system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 16.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 16. Although FIG. 1 illustrates a single instance of the client device 108, in some embodiments, the environment includes multiple different client devices, each associated with a different user (e.g., a digital content requester or searcher). The client device 108 communicates with the server(s) 104 via the network 114. For example, the client device 108 provides information to server(s) 104 indicating client device interactions (e.g., indications of target topics, digital video searches including query terms, and/or other input) and receives information from the server(s) 104 such as topic divergence classifications and digital video search results including indications of topic divergent and topic conforming digital videos. Thus, in some cases, the divergent video classification system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital videos and/or topic divergence classifications (e.g., within digital video search interfaces).

As illustrated in FIG. 1, the environment includes the server(s) 104. The server(s) 104 generates, tracks, stores, processes, receives, and transmits electronic data, such as indications of client device interactions, digital videos, topic divergence classifications, all or part of a topic-specific knowledge encoder neural network, and/or training data (e.g., including synthetic transcripts and/or hybrid transcripts). For example, the server(s) 104 receives data from the client device 108 in the form of an indication of a client device interaction to search for digital videos pertaining to a particular target topic. In response, the server(s) 104 transmits data to the client device 108 to cause the client device 108 to display or present a search result including a set of digital videos together with indications of respective topic divergence classifications for the digital videos.

In some embodiments, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as digital videos, a digital text corpus, and a topic-specific knowledge encoder neural network.

As further shown in FIG. 1, the server(s) 104 also includes the divergent video classification system 102 as part of a digital content management system 106. For example, in one or more implementations, the digital content management system 106 can store, generate, modify, edit, enhance, provide, distribute, and/or share digital content, such as digital videos and indications of topic divergence classifications. For example, the digital content management system 106 provides tools for the client device 108 to, via the client application 110, indicate a target topic and/or provide a search query via a digital video search interface. In some implementations, the digital content management system 106 provides a set of digital videos including indications of topic divergence classifications in response.

In one or more embodiments, the server(s) 104 includes all, or a portion of, the divergent video classification system 102. For example, the divergent video classification system 102 operates on the server(s) to generate a topic divergence classification (e.g., via a topic-specific knowledge encoder neural network) for a digital video based on words from the digital video and words from a digital text corpus.

In certain cases, the client device 108 includes all or part of the divergent video classification system 102. For example, the client device 108 can generate, obtain (e.g., download), or utilize one or more aspects of the divergent video classification system 102, such as a topic-specific knowledge encoder neural network from the server(s) 104. Indeed, in some implementations, as illustrated in FIG. 1, the divergent video classification system 102 is located in whole or in part of the client device 108. For example, the divergent video classification system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the divergent video classification system 102 is implemented by (e.g., located entirely or in part on) the client device 108. In addition, in one or more embodiments, the client device 108 communicates directly with the divergent video classification system 102, bypassing the network 114. Further, in some embodiments, the environment includes a topic-specific knowledge encoder neural network stored in the database 112, maintained by the server(s) 104, the client device 108, or a third-party device.

Figure 2:
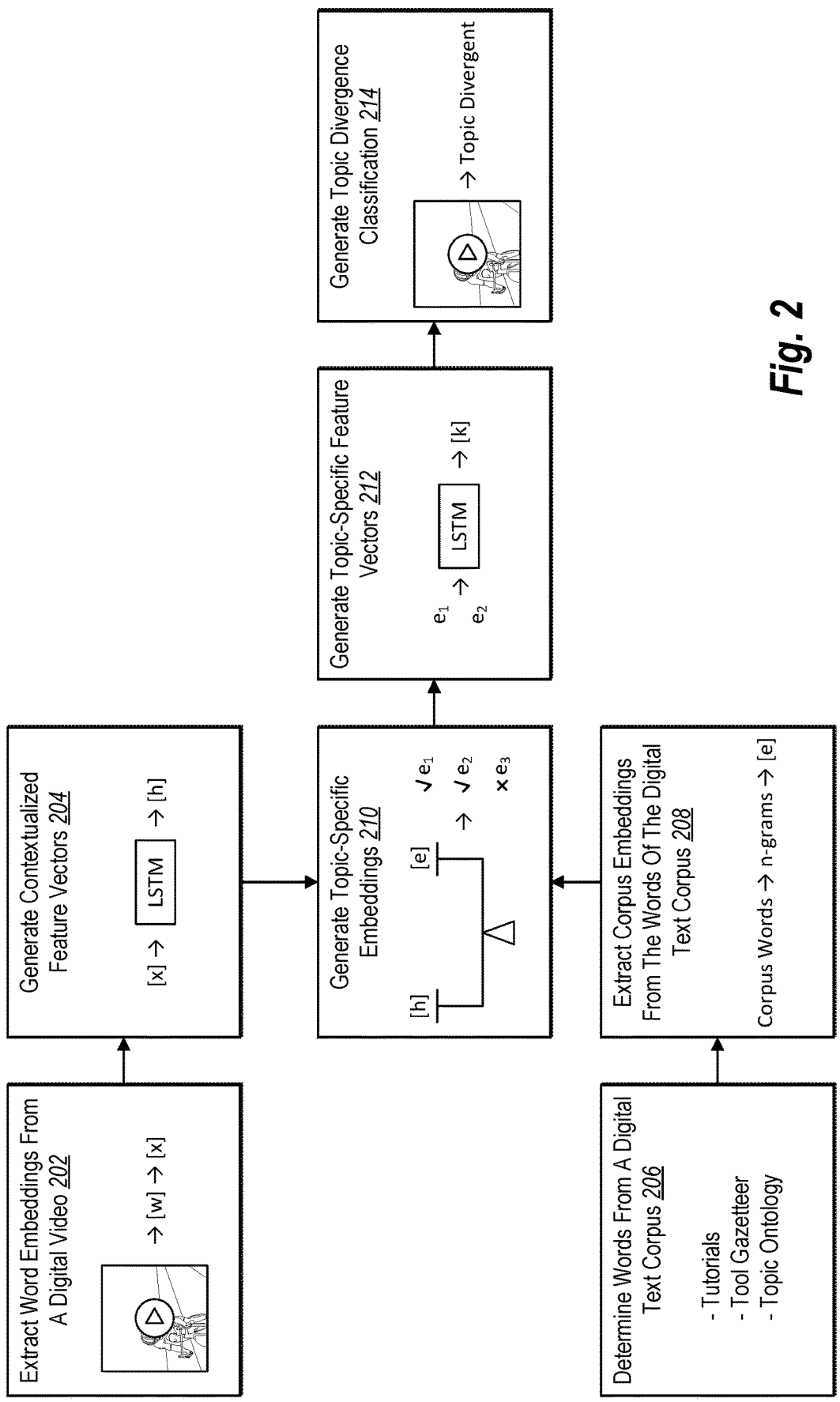
FIG. 2 illustrates an overview of generating a topic divergence classification in accordance with one or more embodiments.

As mentioned, in one or more embodiments, the divergent video classification system 102 generates a topic divergence classification for a digital video to indicate whether the digital video diverges from (or conforms to) a target topic. In particular, the divergent video classification system 102 utilizes a topic-specific knowledge encoder neural network that includes multiple constituent neural network components or layers to generate the topic divergence classification based on a comparison of the digital video with a digital text corpus representing the target topic. FIG. 2 illustrates an example sequence of acts the divergent video classification system 102 performs to generate a topic divergence classification in accordance with one or more embodiments. The description of FIG. 2 provides an overview of generating a topic divergence classification, and the descriptions of subsequent figures provide additional detail regarding the various acts of FIG. 2.

As illustrated in FIG. 2, the divergent video classification system 102 performs an act 202 to extract word embeddings from a digital video. To extract the word embeddings, the divergent video classification system 102 first identifies, detects, or determines words used within a digital video. For example, the divergent video classification system 102 accesses a (pre-generated) transcript of verbal content from the digital video that includes the words used in order of their use. In some embodiments, the divergent video classification system 102 generates the transcript for the digital video by utilizing an automatic transcription model that recognizes speech and transcribes the speech into text.

From the transcript, in one or more embodiments, the divergent video classification system 102 detects, identifies or determines words used in the digital video. For example, the divergent video classification system 102 determines words from the digital video transcript as represented by [w] in FIG. 2. In addition, the divergent video classification system 102 extracts word embeddings from the words [w]. For instance, the divergent video classification system 102 utilizes a word embedding model to extract a word embedding (represented by [x]) for each word used within the digital video. For example, a word embedding can include a (low-dimensional) latent vector that reflects features for a word (e.g., obtained via distributional semantics of the word). In some cases, the divergent video classification system 102 utilizes a particular word embedding model to extract words embeddings, such as GloVe or word2vec.

As further illustrated in FIG. 2, the divergent video classification system 102 also performs an act 204 to generate contextualized feature vectors. More specifically, the divergent video classification system 102 generates the contextualized feature vectors from the word embeddings extracted from the digital video. For instance, as suggested above, a contextualized feature vector can include a (latent) vector that represents the meaning of a word in the context of where the word occurs in relation to (e.g., within a sequence of) other accompanying words within the digital video. In one or more embodiments, to generate a contextualized feature vector for each of the word embeddings (and thus for each of the words of the digital video), the divergent video classification system 102 utilizes an LSTM layer (e.g., within the topic-specific knowledge encoder neural network) to determine hidden states at each time step from the word embeddings [x]. As shown in FIG. 2, the contextualized feature vectors are represented by [h].

As further illustrated in FIG. 2, the divergent video classification system 102 performs an act 206 to determine words from a digital text corpus. In particular, the divergent video classification system 102 determines words from a digital text corpus that defines or represents a target topic. For example, the divergent video classification system 102 determines words from various tutorials (e.g., text-based tutorials or other tutorials with transcripts known to relate to the given target topic), tool names that relate to the target topic from a tool gazetteer for a particular digital content editing application, and keywords from a topic ontology (e.g., an ontology of vocabulary maintained by the digital content management system 106 that includes keywords relating to a target topic) to include within the digital text corpus. In some cases, the divergent video classification system 102 includes only a subset of the above-mentioned content within the digital text corpus, or else includes additional or alternative text content known to relate to a target topic. As suggested above, a target topic often refers to a digital content topic or a digital content domain that is designated as a goal or target of a search query (e.g., to surface digital videos pertaining to the target topic).

In some cases, the divergent video classification system 102 generates the digital text corpus based on client device interaction (e.g., from the client device 108). For instance, divergent video classification system 102 receives an indication from the client device 108 of a particular target topic, and the divergent video classification system 102 determines content related to the target topic to include within the digital text corpus. In some embodiments, the divergent video classification system 102 stores and maintains a plurality of digital text corpuses corresponding to different target topics. Thus, based on receiving a search query from the client device 108 to search for digital videos relating to a target topic, the divergent video classification system 102 accesses a corresponding digital text corpus to use as a reference for generating topic divergence classifications for digital videos in relation to the target topic.

As further illustrated in FIG. 2, the divergent video classification system 102 performs an act 208 to extract corpus embedding from the words of the digital text corpus. More particularly, the divergent video classification system 102 extracts corpus embeddings that represent word meanings for words of the digital text corpus. In some embodiments, the divergent video classification system 102 extracts the corpus embeddings by determining or generating n-grams for the words of the digital text corpus. In addition, the divergent video classification system 102 extracts the corpus embeddings (represented by [e] in FIG. 2) from the n-grams. In some cases, the divergent video classification system 102 extracts the corpus embeddings via max-pooling.

As also illustrated in FIG. 2, the divergent video classification system 102 performs an act 210 to generate topic-specific embeddings. To elaborate, once the divergent video classification system 102 generates the contextualized feature vectors [h] from a given digital video (e.g., generated via the act 204) and the corpus embeddings [e] from a digital text corpus (e.g., extracted via the act 208), the divergent video classification system 102 further generates topic-specific embeddings that represent a relationship between the words of the digital video and the words of the digital text corpus. Indeed, a topic-specific embedding often includes (latent) features that represent a relatedness between a target topic and a word from a digital video.

To generate the topic-specific embeddings, the divergent video classification system 102 compares the contextual feature vectors [h] and the corpus embeddings [e]. For instance, the divergent video classification system 102 determines, for a given contextualized feature vector within [h], similarity scores for each of the corpus embeddings within [e]. In some cases, the divergent video classification system 102 further compares the similarity scores against a similarity threshold. Additionally, the divergent video classification system 102 selects, as the topic-specific embeddings for the given contextualized feature vector (corresponding a particular word from the digital video), a subset of the corpus embeddings that satisfy the similarity threshold. As shown, the divergent video classification system 102 selects $e_1$ and $e_2$ but rejects or excludes $e_3$ for having a similarity score that does not satisfy the similarity threshold. The divergent video classification system 102 further repeats the comparison to select topic-specific embeddings for each contextualized feature vector within [h].

Thus, the divergent video classification system 102 generates a number of topic-specific embeddings for each respective contextualized feature vector within [h]. In some cases, the divergent video classification system 102 does not select any of the corpus embeddings [e] for a particular contextualized feature vector if, for example, no corpus embeddings [e] have similarity scores in relation to the contextualized feature vector that satisfy the similarity threshold. In other cases, the divergent video classification system 102 does not utilize a similarity threshold but instead ranks the corpus embeddings [e] in relation to each respective contextualized feature vector [h] and selects a particular number (e.g., 1, 2, or 5) of top-ranked corpus embeddings [e] specific to each contextualized feature vector [h].

As further illustrated in FIG. 2, the divergent video classification system 102 performs an act 212 to generate topic-specific feature vectors. More specifically, the divergent video classification system 102 generates topic-specific feature vectors that include (latent) features representing relationships or relatedness between words from a digital video and words from a digital text corpus, also incorporating information representing the order or sequence in which the words occur in the digital video. In some embodiments, the divergent video classification system 102 generates the topic-specific feature vectors [k] by utilizing an LSTM layer as part of a topic-specific knowledge encoder neural network. For instance, the divergent video classification system 102 utilizes the LSTM layer to process or analyze the topic-specific embeddings selected from among the corpus embeddings [e] to generate the topic-specific feature vectors [k] from the hidden states at each time step of the LSTM.

Additionally, as illustrated in FIG. 2, the divergent video classification system 102 performs an act 214 to generate a topic divergence classification. In particular, the divergent video classification system 102 generates a topic divergence classification for the digital video from which words were initially determined via the act 202. To generate the topic divergence classification, the divergent video classification system 102 utilizes a topic-specific knowledge encoder neural network to generate, from the topic-specific feature vectors [k], a probability that the digital video is topic divergent (or topic conforming). In some implementations, the divergent video classification system 102 compares the probability against a classification threshold and classifies the digital video as topic divergent if the probability satisfies the classification threshold (or as topic conforming if the probability does not satisfy the threshold). In other implementations, the divergent video classification system 102 generates the probability and indicates (e.g., via a displayed notification) a proportion or a percentage of the digital video that is topic divergent (and a complementary proportion or percentage that is topic conforming) according to the probability. The divergent video classification system 102 further repeats the acts of FIG. 2 for any number of digital videos and/or for any digital text corpus to generate topic divergence classifications for the digital videos in relation to a given digital text corpus.

In some embodiments, a neural network refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network. Along these lines, a topic-specific knowledge encoder neural network sometimes refers to a specific type of neural network that generates topic divergence classifications for digital videos based on topic-specific feature vectors and/or word feature vectors. In some cases, a topic-specific knowledge encoder neural network has a particular architecture and includes one or more LSTM layers and one or more feed-forward layers, as described in further detail below with reference to subsequent figures.

While FIG. 2 primarily describes various acts utilizing different neural networks, in some embodiments, the divergent video classification system 102 utilizes different machine learning models rather than neural networks. For example, instead of utilizing a topic-specific knowledge encoder neural network, the divergent video classification system 102 utilizes a topic-specific knowledge encoder machine learning model having a different architecture to generate a topic divergence classification. In some cases, the topic-specific knowledge encoder machine learning model is an ensemble of one or more decision trees, support vector machines, Bayesian networks, random forest models, or some other machine learning model. Similarly, the base-caller-recalibration system 106 can utilize different machine learning model architectures to generate contextualized vectors, topic-specific feature vectors, and/or other vectors described herein.

Figure 3:
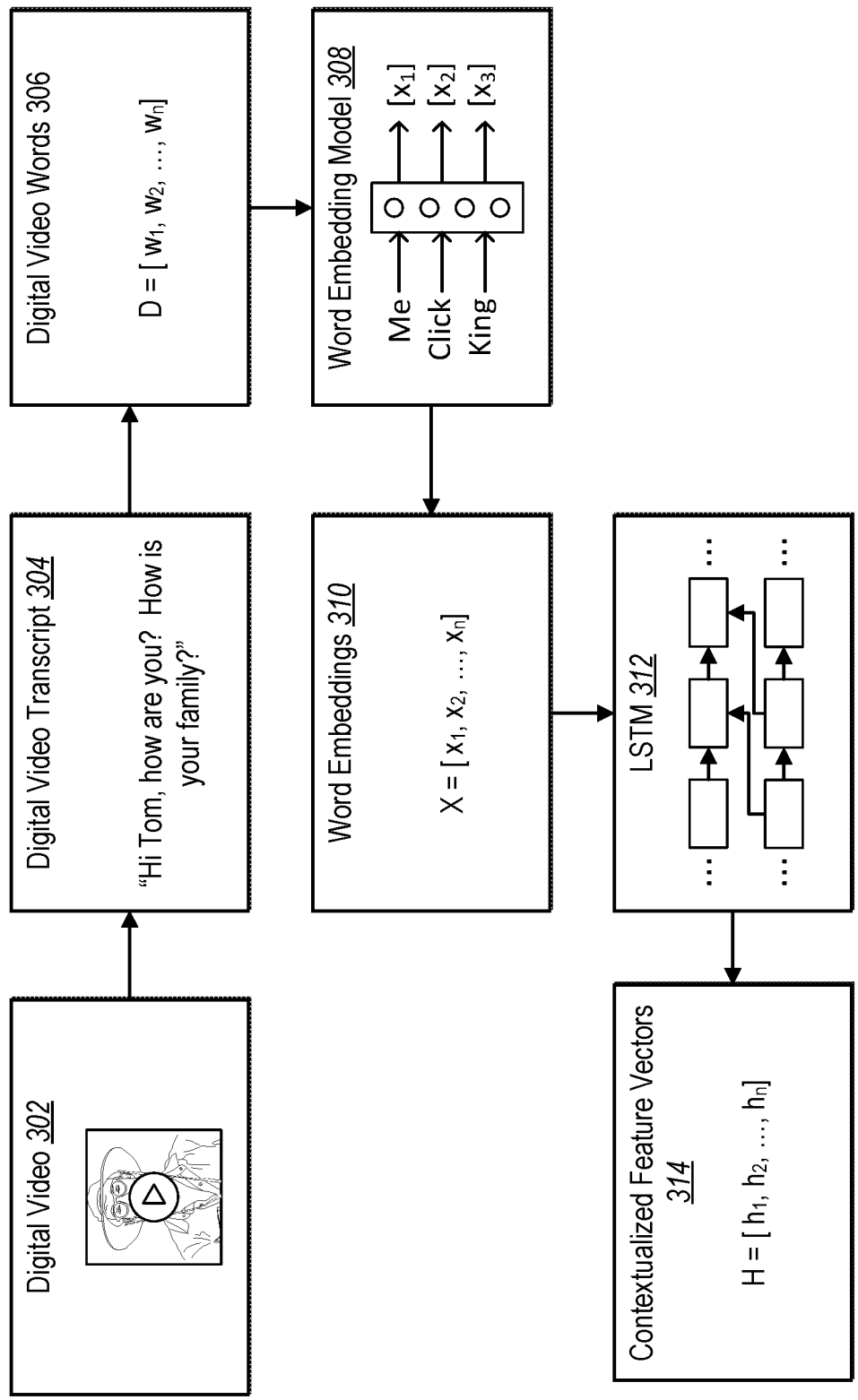
FIG. 3 illustrates an example flow for generating contextualized feature vectors in accordance with one or more embodiments.

As mentioned above, in certain embodiments, the divergent video classification system 102 generates contextualized vectors from words of a digital video. In particular, the divergent video classification system 102 utilizes an LSTM layer of a topic-specific knowledge encoder neural network to generate contextualized feature vectors from word embeddings of the words used within the digital video. FIG. 3 illustrates an example flow for generating contextualized feature vectors in accordance with one or more embodiments.

As illustrated in FIG. 3, the divergent video classification system 102 identifies or selects a digital video 302. For example, the divergent video classification system 102 selects the digital video 302 for comparing against a target topic to generate a topic divergence classification. In some embodiments, the divergent video classification system 102 receives the digital video 302 from the client device 108 (e.g., as an upload or a selection from a website). In other embodiments, the divergent video classification system 102 accesses the digital video from a repository of digital videos stored within the database 112 and maintained by the digital content management system 106.

As further illustrated in FIG. 3, the divergent video classification system 102 generates or obtains a digital video transcript 304 for the digital video 302. To elaborate, in some embodiments, the divergent video classification system 102 generates the digital video transcript 304 utilizing a speech to text model (e.g., from an existing application programming interface) such as S2T. In other embodiments, the divergent video classification system 102 accesses or retrieves the digital video transcript 304 as a transcript from the database 112 and maintained by the digital content management system 106 as corresponding to the digital video 302. As shown in FIG. 3, the digital video transcript 304 includes the text "Hi Tom, how are you? How is your family?"

As also illustrated in FIG. 3, the divergent video classification system 102 determines digital video words 306 from the digital video transcript 304. In particular, the divergent video classification system 102 analyzes the digital video transcript 304 to determine individual words $w_1, w_2, \ldots, w_n$. Indeed, the divergent video classification system 102 generates a vector or an array of the words within the digital video transcript 304, as represented by $D=[w_1, w_2, \ldots, w_n]$. For instance, the word "Hi" is represented by $w_1$, the word "Tom" is represented by $w_2$, and so forth for every word of the digital video transcript 304.

Additionally, as shown in FIG. 3, the divergent video classification system 102 utilizes word embedding model 308 to generate word embeddings 310. More specifically, the divergent video classification system 102 generates the word embeddings 310 from the digital video words 306. For example, the divergent video classification system 102 utilizes the word embedding model 308 (e.g., a GloVe embedding table, a word2vec model, or some other word embedding model) to generate the word embeddings 310, as represented by $X=[x_1, x_2, \ldots, x_n]$. Each of the word embeddings 310 corresponds to a respective word from the digital video words 306 (e.g., $w_1$ corresponds to $x_1$ and so forth).

As further illustrated in FIG. 3, the divergent video classification system 102 utilizes an LSTM 312 to generate contextualized feature vectors 314. In particular, the divergent video classification system 102 generates the contextualized feature vectors 314 from the word embeddings 310, where each word embedding (and therefore each word from the digital video 302) corresponds to a respective contextualized feature vector. The divergent video classification system 102 processes or analyzes the word embeddings 310 utilizing the LSTM 312 and determines the hidden states at each time step of the LSTM 312 to use as the contextualized feature vectors 314. As shown, the contextualized feature vectors 314 are represented by $H=[h_1, h_2, \ldots, h_n]$. The divergent video classification system 102 further utilizes the contextualized feature vectors 314 to compare with corpus embeddings from a digital text corpus, as described in further detail hereafter.

Figure 4:
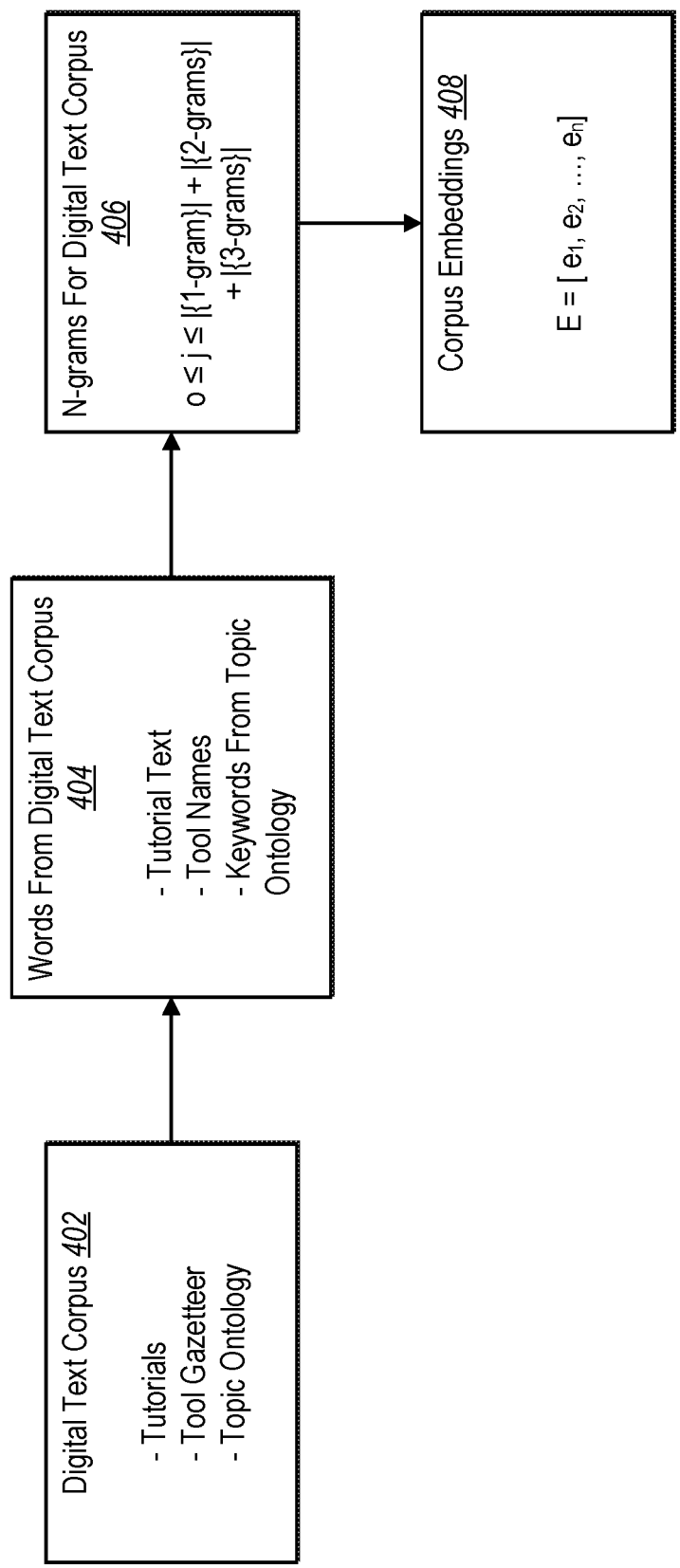
FIG. 4 illustrates an example flow for generating corpus embeddings in accordance with one or more embodiments.

As mentioned above, in certain described embodiments, the divergent video classification system 102 generates corpus embeddings from a digital text corpus. In particular, the divergent video classification system 102 generates corpus embeddings to compare with the contextualized feature vectors 314 to ultimately generate a topic divergence classification for the digital video 302. FIG. 4 illustrates an example flow for generating corpus embeddings in accordance with one or more embodiments.

As illustrated in FIG. 4, the divergent video classification system 102 identifies or generates a digital text corpus 402. More specifically, the divergent video classification system 102 identifies or accesses a digital text corpus 402 maintained by the digital content management system 106 and stored within the database 112. In some cases, the divergent video classification system 102 (or the digital content management system 106) designates or assigns individual digital text corpuses for different target topics, where each digital text corpus includes text content corresponding to a respective target topic. For example, the digital text corpus 402 includes text from different topic-related tutorials, a tool gazetteer for a particular digital content editing application, and/or text from a topic-related ontology of vocabulary associated with the target topic (or a particular digital content editing application). In some embodiments, the divergent video classification system 102 generates the digital text corpus 402 by gathering, collecting, or combining text content from tutorials, tool gazetteers, and a topic ontology.

As further illustrated in FIG. 4, the divergent video classification system 102 extracts or identifies words from the digital text corpus 404. In particular, the divergent video classification system 102 extracts individual words from tutorial text, individual tool names (e.g., magnetic lasso, pencil, eraser, or some other tool) from a tool gazetteer, and keywords from a topic ontology. For example, the divergent video classification system 102 determines keywords from the topic ontology by determining words from the ontology that relate to a particular target topic. In some cases, the divergent video classification system 102 combines the words from tutorial text, the tool names, and/or the keywords from the topic ontology into a single text document.

In addition, as illustrated in FIG. 4, the divergent video classification system 102 extracts or determines n-grams for the digital text corpus 406. In particular, the divergent video classification system 102 determines n-grams by grouping words in differently sized groups or sets. For example, the divergent video classification system 102 determines 1-grams, 2-grams, and 3-grams for all of the words from the digital text corpus 404 by predicting probabilities of upcoming items (e.g., words) in a sequence given the items (e.g., words) that came before. In some cases, a 1-gram is an individual word, a 2-gram is a set of two consecutive words, and a 3-gram is a set of three consecutive words.

As further illustrated in FIG. 4 the divergent video classification system 102 extracts corpus embeddings 408 for the words from the digital text corpus 404. More specifically, the divergent video classification system 102 extracts the corpus embeddings 408 from the n-grams for the digital text corpus 406. In some embodiments, the divergent video classification system 102 represents the extracted n-grams with their corresponding word embeddings $E=[e_1, e_2, \ldots, e_n]$. Indeed, the divergent video classification system 102 extracts the corpus embeddings 408 for all n-grams $0 \leq j \leq |\{1\text{-gram}\}| + |\{2\text{-grams}\}| + |\{3\text{-grams}\}|$. To generate the corpus embeddings 408, in some embodiments, the divergent video classification system 102 determines the max-pool of the n-grams (e.g., the max-pool of the embeddings of the words in each of the n-grams).

By generating the corpus embeddings 408 from the digital text corpus 402, the divergent video classification system 102 generates a reference for a target topic utilizing data not leveraged by prior systems. In some embodiments, the divergent video classification system 102 therefore exhibits improved accuracy and added functionality over these prior systems by more accurately generating topic divergence classifications for specific target topics defined by corpus embeddings (e.g., the corpus embeddings 408). Indeed, many prior systems do not utilize a digital text corpus and cannot accurately generate topic divergence classification for digital videos in relation to specific target topics.

Figure 5:
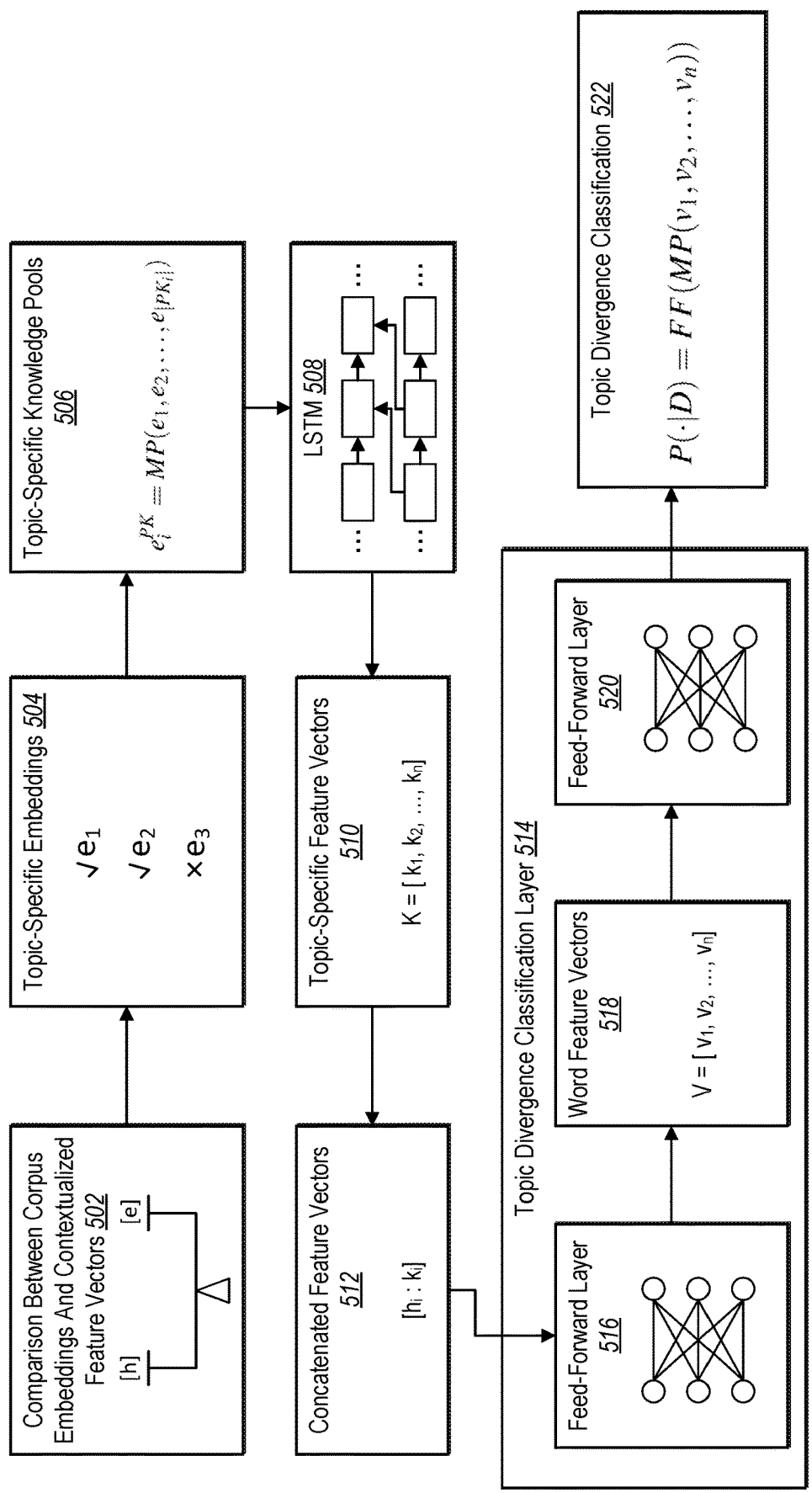
FIG. 5 illustrates an example sequence of acts for generating a topic divergence classification in accordance with one or more embodiments.

As mentioned above, in certain described embodiments, the divergent video classification system 102 generates a topic divergence classification based on a comparison between the corpus embeddings 408 and the contextualized feature vectors 314. In particular, the divergent video classification system 102 compares the corpus embeddings 408 and the contextualized feature vectors 314 to generate topic-specific feature vectors and utilizes a topic-specific knowledge encoder neural network to generate a topic divergence classification from the topic-specific feature vectors. FIG. 5 illustrates an example flow for generating a topic divergence classification in accordance with one or more embodiments.

As illustrated in FIG. 5, the divergent video classification system 102 performs a comparison 502 between corpus embeddings (e.g., the corpus embeddings 408) and contextualized feature vectors (e.g., the contextualized feature vectors 314). More specifically, the divergent video classification system 102 performs the comparison 502 by determining similarity scores. In some cases, the divergent video classification system 102 determines similarity scores utilizing a cosine similarity function (or some other similarity function). For example, the divergent video classification system 102 determines, for every contextualized feature vector in [h], similarity scores for all of the corpus embeddings [e]. Additionally, the divergent video classification system 102 compares the similarity scores with a similarity threshold to determine or identify similarity scores that satisfy the similarity threshold. Thus, for each word of a digital video (e.g., the digital video 302), the divergent video classification system 102 determines a plurality of similarity scores for the corpus embeddings [e] and compares the similarity scores with the similarity threshold.

In addition, as shown in FIG. 5, generates topic-specific embeddings 504. In particular, the divergent video classification system 102 generates the topic-specific embeddings 504 as a subset of the corpus embeddings 408 by selecting corpus embeddings with similarity scores that satisfy the similarity threshold. For example, the divergent video classification system 102 generates a set of topic-specific embeddings 504 for each of the contextualized feature vectors [h] by selecting those corpus embeddings [e] that satisfy the similarity threshold with respect to a respective contextualized feature vector. As shown, the divergent video classification system 102 selects the corpus embeddings $e_1$ and $e_2$ as topic-specific embeddings for a contextualized feature vector and excludes or rejects $e_3$ based on its similarity score.

As further illustrated in FIG. 5, the divergent video classification system 102 generates topic-specific knowledge pools 506. In particular, the divergent video classification system 102 generates a topic-specific knowledge pools for each of the contextualized feature vectors [h] (or for each of the words of the digital video 302). Indeed, in some cases, the selected topic-specific embeddings 504 for a given word act as a pool of knowledge (e.g., knowledge pertaining to a target topic) for the word. In one or more embodiments, the divergent video classification system 102 pools the topic knowledge for a word in accordance with:

$$PK_i = \bigcup_{j=0}^{j_{max}} \{e_j\} \text{ where } h_i \odot e_j \geq \delta$$

where $PK_i$ is the knowledge pool of the $i^{th}$ word $w_i$, $\odot$ is the Hadamard product, and $\delta$ is the similarity threshold for including an n-gram in $w_i$'s knowledge pool.

In certain implementations, to represent a topic-specific knowledge pool for word $w_i$, the divergent video classification system 102 utilizes its max-pooled representation, as given by:

$$e_i^{PK} = MP(e_1, e_2, \ldots, e_{|PK_i|})$$

where $e_i^{PK}$ represents a max-pooled topic-specific knowledge pool (of the topic-specific embeddings 504 selected from the corpus embeddings 408) for $w_i$ and where MP represents a max-pooling function.

As further illustrated in FIG. 5, the divergent video classification system 102 generates topic-specific feature vectors 510 from the topic-specific knowledge pools 506. For example, the divergent video classification system 102 utilizes an LSTM 508 to generate the topic-specific feature vectors 510 by analyzing the topic-specific knowledge pools 506 and determining the hidden states of the LSTM 508 at each time step. In some embodiments, the LSTM 508 is a one-layer LSTM that generates the topic-specific feature vectors 510 represented by K=[$k_1, k_2, \ldots, k_n$] from the topic-specific knowledge pools 506 represented by $E^{PK}$=[$e_i^{PK}$]. In certain implementations, the LSTM 508 is a multilayer and/or bidirectional LSTM. By utilizing the LSTM 508 to generate or extract the topic-specific feature vectors 510, the divergent video classification system 102 encodes or incorporates sequential information (e.g., the sequential order) of the topic-specific knowledge pertaining to each word (e.g., as the word appears in its place within the digital video 302).

Additionally, as shown in FIG. 5, the divergent video classification system 102 generates concatenated feature vectors 512 from the topic-specific feature vectors 510. More specifically, the divergent video classification system 102 combines (e.g., concatenates, adds, multiplies) the topic-specific feature vectors [k] with the contextualized feature vectors [h] (e.g., the contextualized feature vectors 314).

As shown in FIG. 5, the divergent video classification system 102 further utilizes a topic divergence classification layer 514 of a topic-specific knowledge encoder neural network to generate a topic divergence classification 522 from the concatenated feature vectors 512. More particularly, the divergent video classification system 102 utilizes a feed-forward layer 516 (e.g., a two-layer feed-forward layer) of the topic divergence classification layer 514 to generate word feature vectors 518 from the concatenated feature vectors 512. In some embodiments, the divergent video classification system 102 generates word feature vectors for the words of the digital video 302, represented by V=[$v_1, v_2, \ldots, v_n$]. For example, the divergent video classification system 102 utilizes the feed-forward layer 516 to generate the word feature vectors 518 in accordance with:

$$v_i = FF([h_i; k_i])$$

where FF represents the feed-forward layer 516, $h_i$ represents the contextualized feature vector of the word $w_i$, $k_i$ represents the topic-specific feature vector of the word $w_i$, and : represents a concatenation function (or some other type of combination).

In one or more embodiments, the divergent video classification system 102 further max-pools the word feature vectors 518 and utilizes another feed-forward layer 520 to generate the topic divergence classification 522 from the max-pooled representation of the word feature vectors 518. For instance, the divergent video classification system 102 generates the topic divergence classification 522 in the form of a probability distribution given by:

$$P(\cdot|D) = FF(MP(v_1, v_2, \ldots, v_n))$$

where P is a probability distribution, FF is the feed-forward layer 520, and MP is a max-pooling function. Thus, the divergent video classification system 102 generates a topic divergence classification 522 that indicates probabilities (distributed across the word feature vectors 518) of topic divergence (or topic conformance).

As described, the divergent video classification system 102 generates a topic divergence classification 522 that indicates whether the digital video 302 diverges from the target topic or conforms to the target topic. In some cases, the divergent video classification system 102 generates the topic divergence classification 522 as an overall (e.g., combined or average across the word feature vectors 518) probability that the digital video 302 is topic divergent. In certain embodiments, the divergent video classification system 102 further compares the probability of topic divergence against a topic divergence threshold (e.g., 0.7) and indicates that the digital video 302 is topic divergent only if the probability satisfies the topic divergence threshold. Otherwise, the divergent video classification system 102 determines that the digital video 302 is topic conforming.

In some cases, the divergent video classification system 102 further (or alternatively) utilizes a topic conforming threshold (e.g., 0.3) and determines that the digital video 302 is topic conforming only if the probability of topic divergence is below 30% or 0.3. In these or other cases, if the digital video 302 has a topic divergence probability between the two thresholds (e.g., between 0.3 and 0.7) the divergent video classification system 102 determines that the digital video is both topic divergent in parts and topic conforming in parts. In some embodiments, the divergent video classification system 102 determines a proportion of the digital video 302 that is topic divergent and a portion that is topic conforming according to the probability distribution across the word feature vectors 518.

In some implementations, the divergent video classification system 102 analyzes a digital video (e.g., the digital video 302) and classifies different portions of the digital video differently. To elaborate, the divergent video classification system 102 can determine that a first portion of a single digital video is topic divergent and a second portion of the digital video is topic conforming. In certain cases, the divergent video classification system 102 designates topic divergent portions and topic conforming portions by providing time markers indicating which segments or portions are topic divergent and which are topic conforming.

In one or more embodiments, the divergent video classification system 102 provides a notification of the topic divergence classification 522 for the digital video 302. The notification can take the form of a binary indication (e.g., "topic divergent" or "topic conforming"), can include a numerical representation of the probability that the digital video 302 is topic divergent, or can include a numerical representation of a proportion or percentage of the digital video 302 determined to be topic divergent (e.g., according to the probability distribution across the word feature vectors 518).

Figure 6:
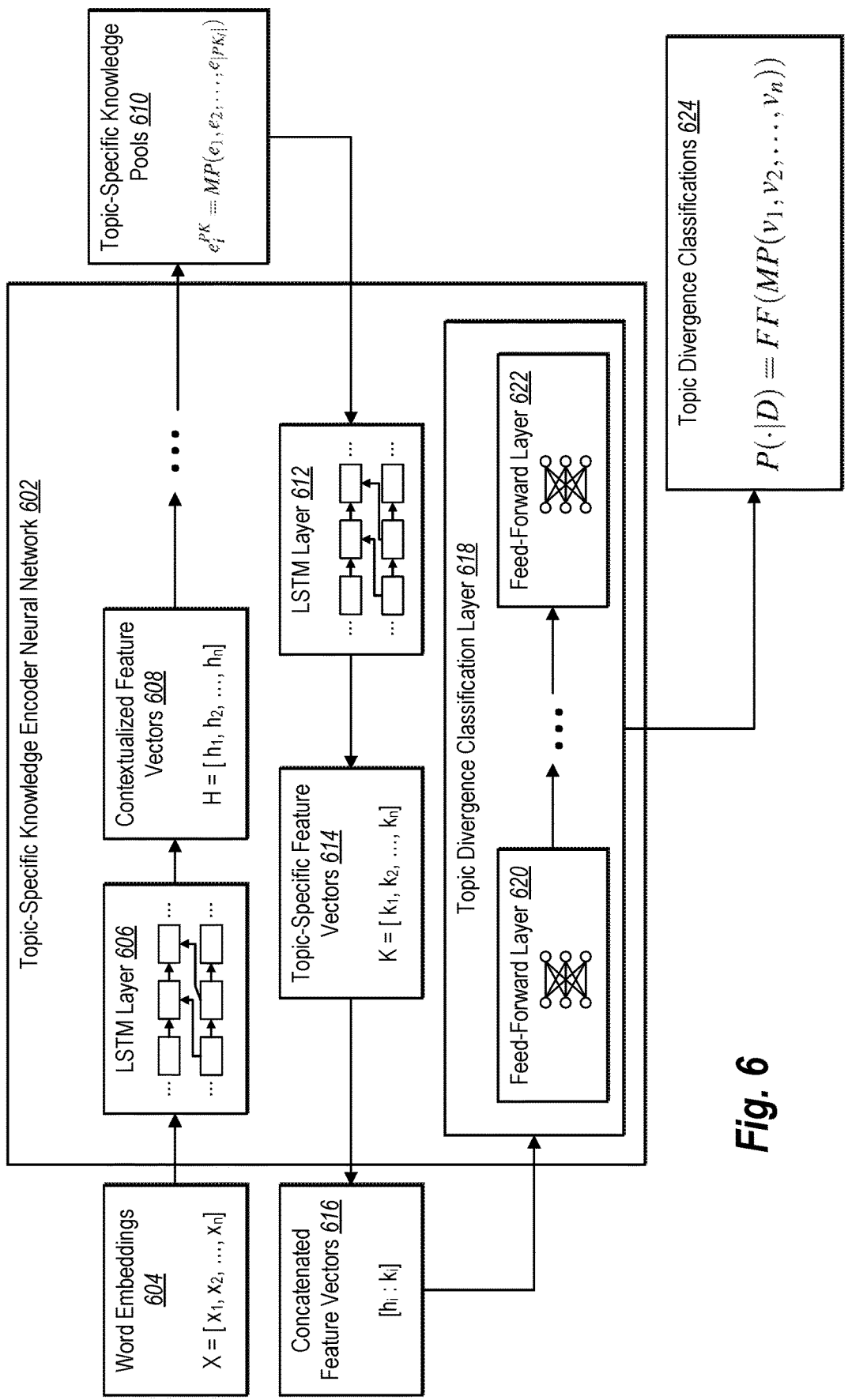
FIG. 6 illustrates an example architecture of a topic-specific knowledge encoder neural network in accordance with one or more embodiments.

As mentioned above, in certain described embodiments, the divergent video classification system 102 utilizes a topic-specific knowledge encoder neural network to generate a topic divergence classification for a digital video. In particular, the divergent video classification system 102 utilizes a topic-specific knowledge encoder neural network with a particular structure or network architecture. FIG. 6 illustrates an example structure of a topic-specific knowledge encoder neural network in accordance with one or more embodiments.

As illustrated in FIG. 6, the topic-specific knowledge encoder neural network 602 accepts word embeddings 604 (e.g., the word embeddings 310) and utilizes an LSTM layer 606 (e.g., the LSTM 312) to generate contextualized feature vectors 608 (e.g., the contextualized feature vectors 314) from the word embeddings 604. Indeed, the topic-specific knowledge encoder neural network 602 determines hidden states of the LSTM layer 606 to use as the contextualized feature vectors 608.

Additionally, the divergent video classification system 102 generates topic-specific knowledge pools 610 (e.g., the topic-specific knowledge pools 506) based on comparing the contextualized feature vectors 608 with corpus embeddings (e.g., the corpus embeddings 408) from a digital text corpus. Further, the divergent video classification system 102 utilizes a second LSTM layer 612 (e.g., the LSTM 508) to generate topic-specific feature vectors 614 (e.g., the topic-specific feature vectors 510) from the topic-specific knowledge pools 610.

In addition, the divergent video classification system 102 generates concatenated feature vectors 616 (e.g., the concatenated feature vectors 512) from the topic-specific feature vectors 614 and corresponding contextualized feature vectors (e.g., the contextualized feature vectors 314). As shown, the topic-specific knowledge encoder neural network 602 further includes a topic divergence classification layer 618. Indeed, the divergent video classification system 102 utilizes the topic divergence classification layer 618 of the topic-specific knowledge encoder neural network 602 to generate a topic divergence classification 624 (e.g., the topic divergence classification 522).

In some embodiments, the divergent video classification system 102 utilizes a first feed-forward layer 620 (e.g., the feed-forward layer 516) and a second feed-forward layer 622 (e.g., the feed-forward layer 520) of the topic divergence classification layer 618 to generate the topic divergence classification 624. Indeed, as described in relation to FIG. 5, the divergent video classification system 102 utilizes the first feed-forward layer 620 to generate word feature vectors and utilizes the second feed-forward layer to generate the topic divergence classification 624 from the word feature vectors. FIG. 6 illustrates a particular architecture for the topic-specific knowledge encoder neural network 602, though other architectures are also possible. For example, the LSTM layers and/or the feed-forward layers may have different numbers of layers or neurons in different embodiments.

Figure 7:
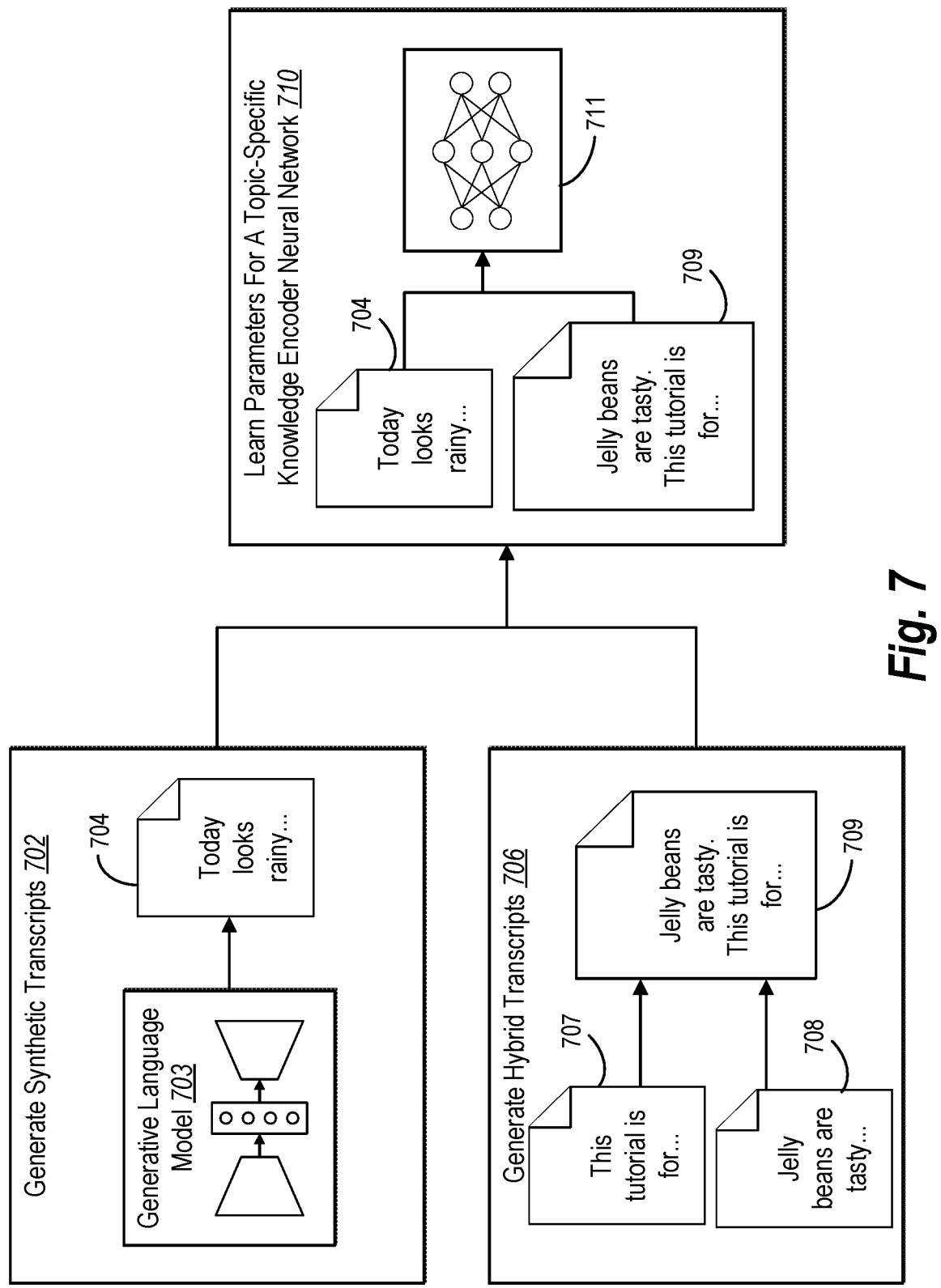
FIG. 7 illustrates an example process of learning parameters for a topic-specific knowledge encoder neural network utilizing synthetic transcripts and/or hybrid transcripts in accordance with one or more embodiments.

As mentioned above, in certain described embodiments, the divergent video classification system 102 learns parameters for the topic-specific knowledge encoder neural network 602 via a training or tuning process. In particular, the divergent video classification system 102 utilizes an iterative training process to generate predictions, compare those predictions against ground truth data, and back propagate to modify internal parameters (e.g., weights and biases) of the topic-specific knowledge encoder neural network 602 to improve its accuracy. In some embodiments, the divergent video classification system 102 utilizes specialized training data to learn parameters for the topic-specific knowledge encoder neural network 602, including synthetic transcripts and/or hybrid transcripts of digital videos. FIG. 7 illustrates an example sequence of acts the divergent video classification system 102 performs to learn parameters of the topic-specific knowledge encoder neural network 602 utilizing synthetic transcripts and hybrid transcripts in accordance with one or more embodiments.

As illustrated in FIG. 7, the divergent video classification system 102 performs an act 702 to generate synthetic transcripts. More specifically, the divergent video classification system 102 generates synthetic digital video transcripts utilizing a generative language model 703. For instance, the divergent video classification system 102 generates synthetic transcripts that are not actually from any digital videos but that are fabricated via the generative language model 703 to resemble a transcript from a topic divergent digital video. For example, the divergent video classification system 102 utilizes the generative language model 703 to generate the synthetic transcript 704 that includes the words "Today looks rainy . . . ." Indeed, a synthetic transcript sometimes refers to an artificially generated digital video transcript that is topic divergent (or topic conforming). Additionally, a generative language model sometimes refers to a machine learning model (e.g., a neural network) such as a Generative Pretrained Transformer-2 ("GPT-2") model pretrained to generate topic divergent transcripts. Additional detail regarding generating synthetic transcripts and pretraining the generative language model 703 is provided hereafter with reference to subsequent figures.

As further illustrated in FIG. 7, the divergent video classification system 102 performs an act 706 to generate hybrid transcripts. In particular, the divergent video classification system 102 generates hybrid digital video transcripts that include sentences from topic divergent transcripts and sentences from topic conforming transcripts. As shown, the divergent video classification system 102 generates the hybrid transcript 709 from the topic conforming transcript 707 and the topic divergent transcript 708. Specifically, the divergent video classification system 102 combines (portions of) the topic conforming transcript 707 with (portions of) the topic divergent transcript 708. Indeed, the divergent video classification system 102 replaces a percentage of the sentences within the topic divergent transcript 708 with sentences from the topic conforming transcript 707 (or vice-versa). As shown, the hybrid transcript 709 includes a sentence from each of the topic conforming transcript 707 ("This tutorial is for . . . .") and the topic divergent transcript 708 ("Jelly beans are tasty."). Additional detail regarding generating hybrid transcripts is provided below with reference to subsequent figures.

As also illustrated in FIG. 7, the divergent video classification system 102 performs an act 710 to learn parameters for a topic-specific knowledge encoder neural network. More specifically, the divergent video classification system 102 utilizes the synthetic transcript 704 (and other synthetic transcripts) and the hybrid transcript 709 (and other hybrid transcripts) to learn parameters for the topic-specific knowledge encoder neural network 711 (e.g., the topic-specific knowledge encoder neural network 602).

For instance, the divergent video classification system 102 utilizes the topic-specific knowledge encoder neural network 711 to generate a predicted topic divergence classification for the synthetic transcript 704. In addition, the divergent video classification system 102 compares the predicted topic divergence classification with a ground truth topic divergence classification (e.g., an indication that the synthetic transcript is topic divergent) utilizing a synthetic loss function. Further, the divergent video classification system 102 back propagates to modify parameters (e.g., weights and biases) of the topic-specific knowledge encoder neural network 711 to reduce the measure of loss and improve accuracy. The divergent video classification system 102 repeats the aforementioned iterative process for a number of iterations or epochs until a threshold measure of loss (or a threshold accuracy) is satisfied—e.g., until the predicted topic divergence classification is within a threshold loss of the ground truth topic divergence classification.

In addition (or alternatively), the divergent video classification system 102 learns parameters utilizing the hybrid transcript 709. For example, the divergent video classification system 102 utilizes the same iterative process as above by: i) generating a predicted topic divergence classification from the hybrid transcript 709 utilizing the topic-specific knowledge encoder neural network 711, ii) comparing the predicted topic divergence classification with a ground truth topic divergence classification known for the hybrid transcript (e.g., a non-binary indication of a percentage of topic divergent sentences replaced with topic conforming sentences) utilizing a hybris loss function, and iii) back propagating to modify parameters of the topic-specific knowledge encoder neural network 711 to adjust how the topic-specific knowledge encoder neural network 711 passes and processes data for reducing the measure of loss. The divergent video classification system 102 repeats the process for a predetermined time (or number of iterations) or until the measure of loss between the predicted topic divergence classification and the ground truth topic divergence classification satisfies a threshold measure of loss.

Figure 8:
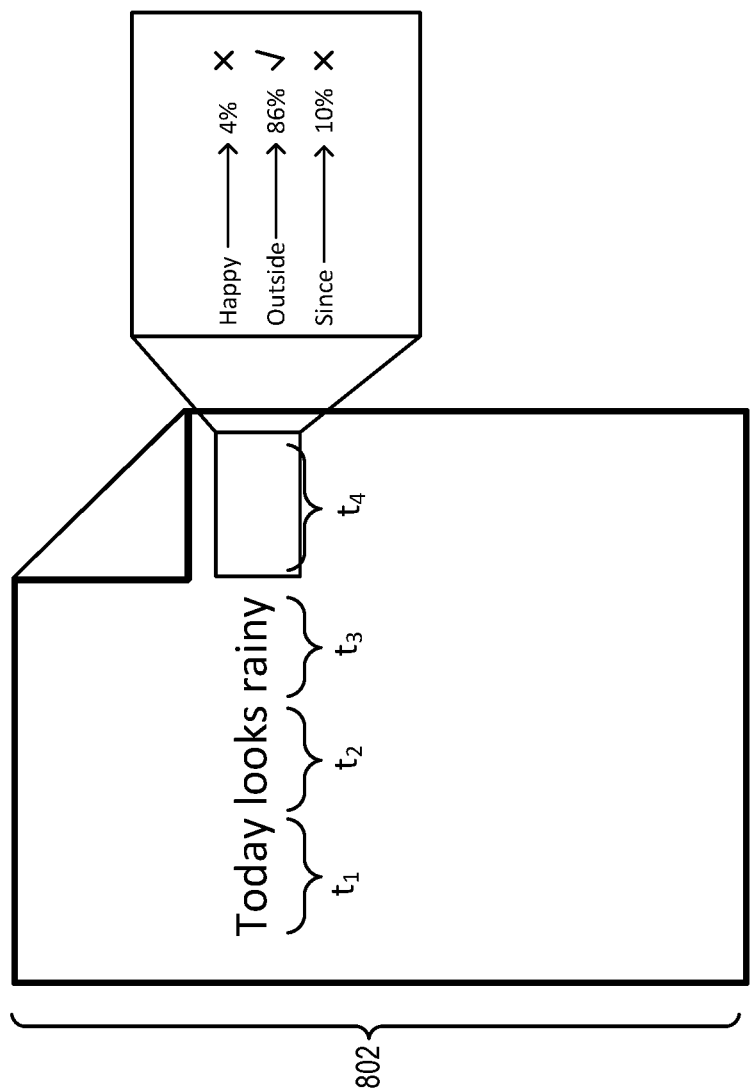
FIG. 8 illustrates generating a synthetic transcript in accordance with one or more embodiments.

As mentioned, in certain described embodiments, the divergent video classification system 102 generates synthetic transcripts. In particular, the divergent video classification system 102 generates synthetic transcripts to use for learning parameters for a topic-specific knowledge encoder neural network. FIG. 8 illustrates an example of generating a synthetic transcript in accordance with one or more embodiments.

As illustrated in FIG. 8, the divergent video classification system 102 generates a synthetic transcript 802. In particular, the divergent video classification system 102 utilizes a generative language model (e.g., the generative language model 703) to generate the synthetic transcript 802. For example, the divergent video classification system 102 utilizes the generative language model to predict words belonging at each time step (e.g., $t_1, t_2, \ldots, t_n$) of a digital video (or of the synthetic transcript 802). In some cases, the divergent video classification system 102 generates predicts for the words at respective time steps based on previous words (e.g., words that were predicted beforehand).

To generate predicted words at the different time steps, in certain described embodiments, the divergent video classification system 102 pretrains a generative language model (e.g., the generative language model 703). Indeed, the divergent video classification system 102 pretrains a generative language model to accurately generate synthetic transcripts that resemble topic divergent transcripts. In particular, the divergent video classification system 102 utilizes an objective function to tune the parameters of the generative language model. For instance, the divergent video classification system 102 generates a prediction of the $i^{th}$ word of the synthetic transcript 802 based on the i−1 words that came before. In some embodiments, the divergent video classification system 102 pretrains the generative language model according to the following objective function:

$$\mathcal{L}_{LM} = -\Sigma_{i=0}^{|D|} \log(P(w_i | D_{1:i-1}, \theta))$$

where D represents the synthetic transcript 802, $D_{1:i-1}$ represents the words of D from the beginning up to the $(i-1)^{th}$ word, and θ represents the parameters of the generative language model.

In some embodiments, the divergent video classification system 102 augments the synthetic transcript 802 (D) with two special tokens, <BOS> at the beginning and <EOS> at the end. For instance, the divergent video classification system 102 starts the synthetic transcript 802 with the <BOS> token and determines probabilities for words at each time step t throughout the synthetic transcript 802. Indeed, the divergent video classification system 102 generates, for each time step, a probability that a particular word belongs at a particular time step within the synthetic transcript 802. In some embodiments, the divergent video classification system 102 determines the probabilities for words at time steps according to:

$$P(\cdot | D_{1:t-1}', \theta)$$

where $D_{1:t-1}$ represents the words through the time steps t to t−1. The divergent video classification system 102 further selects the word with the highest probability for each respective time step in the synthetic transcript 802.

As shown, the divergent video classification system 102 generates a predicted word for the time step $t_4$ based on the words in the previous time steps $t_1$-$t_3$. Indeed, the divergent video classification system 102 generates probabilities for different words such as "Happy," "Outside," and "Since." As illustrated, the divergent video classification system 102 selects the word "Outside" for $t_4$ because it has the highest probability at 86%, compared to 4% and 10% for the other two words.

The divergent video classification system 102 continues to generate predicted words for the synthetic transcript 802 until a termination criterion is satisfied. For example, the divergent video classification system 102 continues to generate predicted words until adding or detecting the stop token <EOS>. As another example, the divergent video classification system 102 continues to add words until the synthetic transcript 802 reaches a maximum length or a threshold length (e.g., a threshold number of words).

Figure 9:
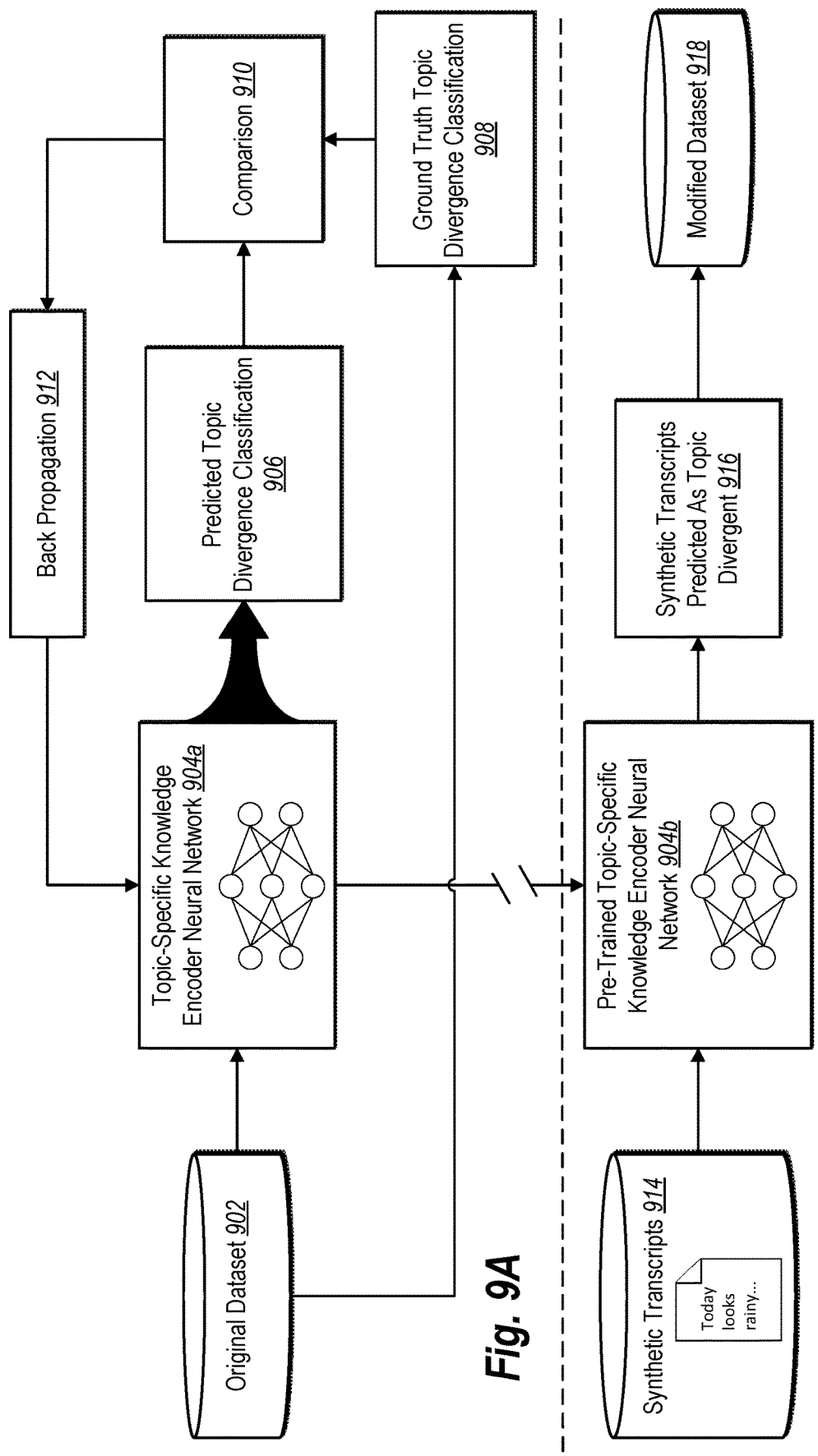
FIGS. 9A-9B illustrate pretraining and utilizing a topic-specific knowledge encoder neural network to identify synthetic transcripts in accordance with one or more embodiments.

As mentioned above, in some embodiments, the divergent video classification system 102 generates a modified dataset for training a topic-specific knowledge encoder neural network based on synthetic transcripts. In particular, the divergent video classification system 102 modifies an initial dataset (e.g., a Behance® dataset) to include synthetic transcripts to use for learning parameters of a topic-specific knowledge encoder neural network. FIGS. 9A-9B illustrate an example process the divergent video classification system 102 performs to generate a modified dataset including synthetic transcripts in accordance with one or more embodiments.

As illustrated in FIG. 9A, the divergent video classification system 102 accesses an original dataset 902. In particular, the divergent video classification system 102 identifies or determines an original dataset 902 that includes stored digital videos labeled as topic divergent and topic conforming. In some embodiments, the original dataset 902 includes a relatively small number of topic divergent digital videos (or topic divergent transcripts), and the original dataset 902 is (as a result of bias) not effective for robust training of a topic-specific knowledge encoder neural network in the end. However, the divergent video classification system 102 pretrains a topic-specific knowledge encoder neural network 904a (e.g., the topic-specific knowledge encoder neural network 602) based on the original dataset 902 to utilize as a baseline for determine which synthetic transcripts to include within a modified dataset (e.g., the modified dataset 918 of FIG. 9B). Then, utilizing the modified dataset 918, the divergent video classification system 102 re-learns parameters for the topic-specific knowledge encoder neural network 904a.

To elaborate, the divergent video classification system 102 initially pretrains the topic-specific knowledge encoder neural network 904a utilizing the original dataset 902. In particular, the divergent video classification system 102 selects a digital video (or a transcript) from the original dataset 902 and utilizes the topic-specific knowledge encoder neural network 904a to generate a predicted topic divergence classification 906 for the selected digital video. For instance, the divergent video classification system 102 generates the predicted topic divergence classification 906 for a topic divergent video (or a topic divergent transcript).

In addition, the divergent video classification system 102 performs a comparison 910 of the predicted topic divergence classification 906 and a ground truth topic divergence classification 908. Indeed, the divergent video classification system 102 accesses or identifies the ground truth topic divergence classification 908 corresponding to the selected digital video from the original dataset 902. To perform the comparison 910, the divergent video classification system 102 utilizes a loss function such as a cross entropy loss function or a log-likelihood loss function. For instance, the divergent video classification system 102 utilizes a loss function of the form:

$$\mathcal{L}_{pred} = -\log(P(l|D))$$

where l is the ground truth topic divergence classification 908 and D is the selected digital video or the selected transcript.

Based on the comparison (e.g., based on a measure of loss between the predicted topic divergence classification 906 and the ground truth topic divergence classification 908), the divergent video classification system 102 further performs a back propagation 912. Indeed, the divergent video classification system 102 back propagates to modify parameters of the topic-specific knowledge encoder neural network 904a such as internal weights and parameters that affect how the different layers and neurons analyze and pass data. For instance, the divergent video classification system 102 modifies parameters to reduce the measure of loss resultant from the comparison 910. The divergent video classification system 102 further repeats the process of pretraining the topic-specific knowledge encoder neural network 904a on the original dataset 902 until the measure of loss satisfies a threshold loss (or for a threshold number of iterations).

Once the topic-specific knowledge encoder neural network 904a is trained with parameters that result in accurate predictions, the divergent video classification system 102 leverages the pre-trained topic-specific knowledge encoder neural network 904b to identify or select synthetic transcripts to include within a modified dataset 918. Indeed, as illustrated in FIG. 9B, the divergent video classification system 102 accesses or identifies a plurality of synthetic transcripts 914 (e.g., generated as described in relation to FIG. 8) and selects a subset of the synthetic transcripts 914 to include within the modified dataset 918 for ultimately training (or retraining) the topic-specific knowledge encoder neural network 904a.

More specifically, the divergent video classification system 102 utilizes the pre-trained topic-specific knowledge encoder neural network 904b (e.g., pre-trained as described in relation to FIG. 9A) to generate predicted topic divergence classifications for the plurality of synthetic transcripts 914. In addition, the divergent video classification system 102 selects, from among the plurality of synthetic transcripts 914, synthetic transcripts that are predicted as topic divergent 916 to include within the modified dataset 918. In some cases, the divergent video classification system 102 discards or excludes synthetic transcripts not classified as topic divergent (e.g., synthetic transcripts classified as topic conforming) from the modified dataset 918. For instance, the divergent video classification system 102 adds only those synthetic transcripts that are classified as topic divergent into the modified dataset 918. The divergent video classification system 102 can then utilizes these topic divergent, synthetic transcripts from the modified dataset 918 to train a topic-specific knowledge encoder neural network (e.g., further train the topic-specific knowledge encoder neural network 904b).

Figure 10:
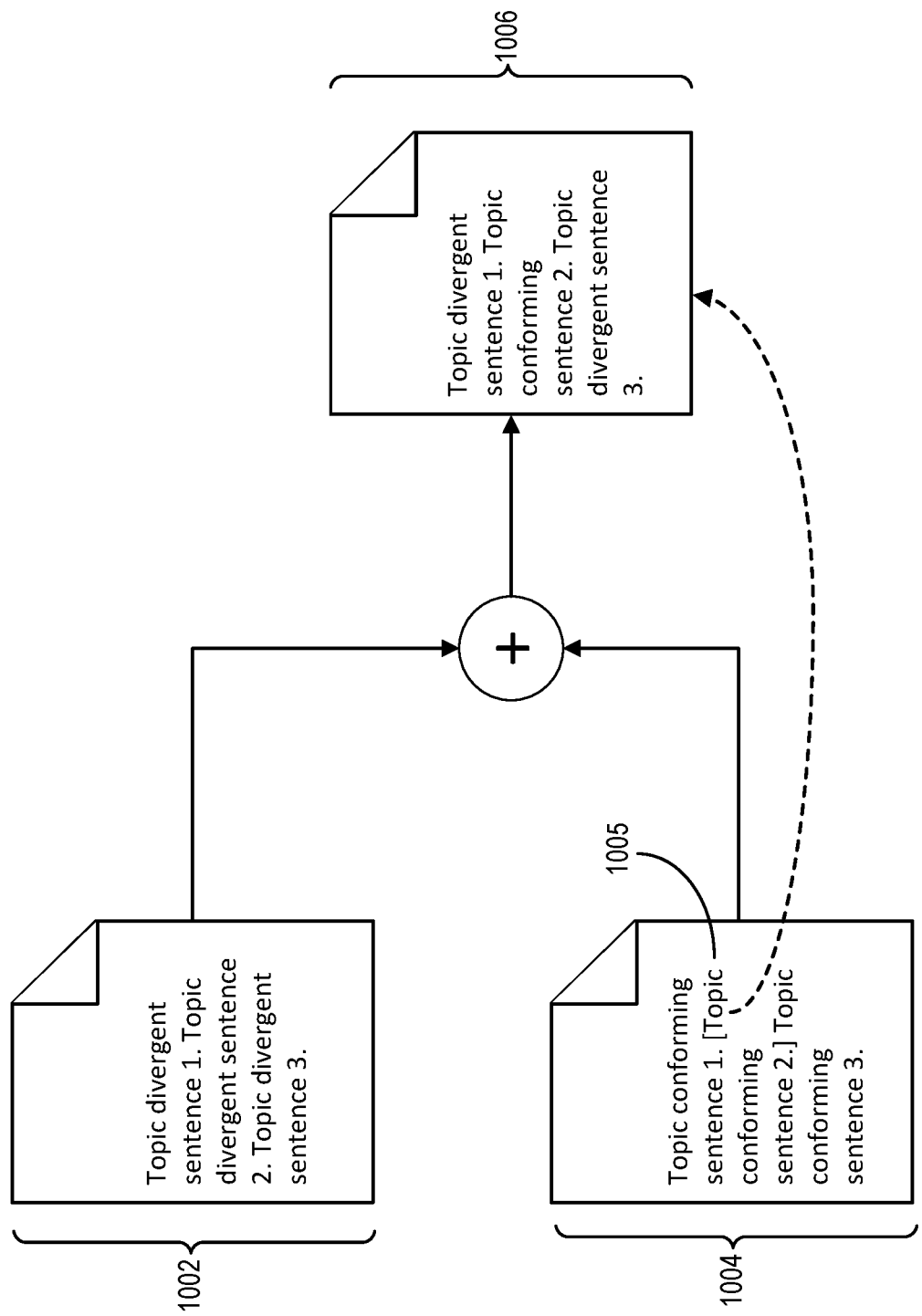
FIG. 10 illustrates generating a hybrid transcript in accordance with one or more embodiments.

As mentioned, in certain described embodiments, the divergent video classification system 102 generates hybrid transcripts (e.g., the hybrid transcript 709) to use for learning parameters of a topic-specific knowledge encoder neural network. In particular, the divergent video classification system 102 generates a hybrid transcript by combining a topic divergent transcript and a topic conforming transcript. FIG. 10 illustrates generating a hybrid transcript in accordance with one or more embodiments. By utilizing hybrid transcripts within a training dataset as described, the divergent video classification system 102 improves generalization ability and robustness of a topic-specific knowledge encoder neural network.

As illustrated in FIG. 10, the divergent video classification system 102 combines a topic divergent transcript 1002 and a topic conforming transcript 1004 together to generate a hybrid transcript 1006. More specifically, the divergent video classification system 102 determines a number, a proportion, or a percentage of sentences of a topic divergent transcript to replace with sentences from a topic conforming transcript. For example, the divergent video classification system 102 uniformly selects a random number p from [0,1] and removes p percent of the sentences from the topic divergent transcript 1002 to replace with sentences randomly selected from the topic conforming transcript 1004.

As shown, the divergent video classification system 102 selects the sentence 1005 to replace a sentence in the topic divergent transcript 1002. In particular, the divergent video classification system 102 replaces the second sentence from the topic divergent transcript 1002 ("Topic divergent sentence 2.") with the sentence 1005 from the topic conforming transcript 1004 ("Topic conforming sentence 2."). In some case, the divergent video classification system 102 replaces other portions of transcripts such as individual words, paragraphs, or other text segments. As shown, the hybrid transcript 1006 includes the first sentence and the third sentence from the topic divergent transcript 1002 and includes the second sentence from the topic conforming transcript 1004.

Figure 11:
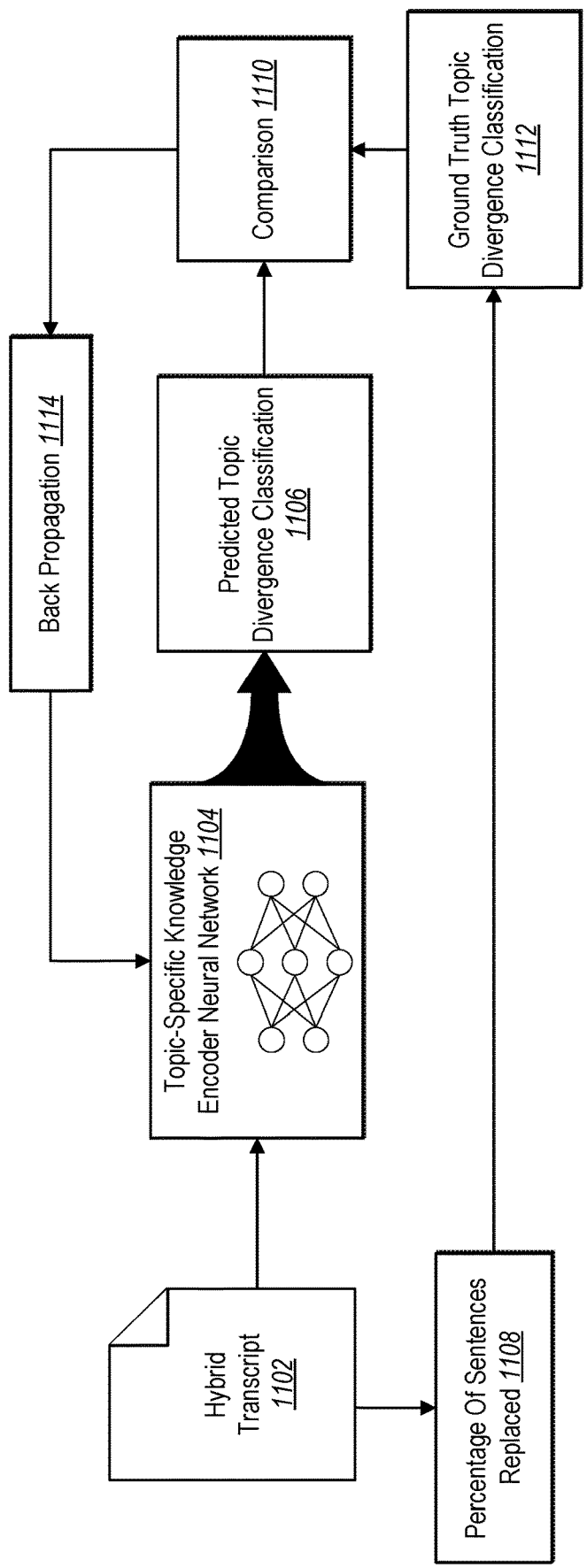
FIG. 11 illustrates a training process for learning parameters of a topic-specific knowledge encoder neural network in accordance with one or more embodiments.

As mentioned above, in some embodiments, the divergent video classification system 102 utilizes a modified dataset (e.g., the modified dataset 918) to learn parameters for a topic-specific knowledge encoder neural network (e.g., the topic-specific knowledge encoder neural network 904a or 602). For example, the divergent video classification system 102 generates a modified dataset to include synthetic transcripts and/or hybrid transcripts along with original topic divergent transcripts and original topic conforming transcripts. In some embodiments, the divergent video classification system 102 further utilizes the modified dataset to learn parameters for the topic-specific knowledge encoder neural network. FIG. 11 illustrates learning parameters for a topic-specific knowledge encoder neural network utilizing a hybrid transcript in accordance with one or more embodiments.

To elaborate, the divergent video classification system 102 accesses, generates, or identifies a hybrid transcript 1102 (e.g., the hybrid transcript 1006). In addition, the divergent video classification system 102 utilizes the topic-specific knowledge encoder neural network 1104 (e.g., the topic-specific knowledge encoder neural network 904a or 602) to generate a predicted topic divergence classification 1106 from the hybrid transcript 1102. As shown, the divergent video classification system 102 further performs a comparison 1110 between the predicted topic divergence classification 1106 and a ground truth topic divergence classification 1112. In some cases, the predicted topic divergence classification 1106 is not a binary classification but rather indicates or reflects a predicted proportion or a predicted percentage of the hybrid transcript 1102 that is topic divergent (or topic conforming).

In one or more implementations, the divergent video classification system 102 generates or determines the ground truth topic divergence classification 1112 for the hybrid transcript 1102. For instance, the divergent video classification system 102 determines or randomly selects a percentage p of sentences replaced 1108 within a topic divergent transcript to generate the hybrid transcript 1102. Based on the percentage of sentences replaced 1108, the divergent video classification system 102 determines the ground truth topic divergence classification 1112. Specifically, the divergent video classification system 102 determines the ground truth topic divergence classification 1112 as a label reflecting the percentage of sentences replaced 1108 (e.g., p) or the percentage of sentence not replaced (e.g., 1-p).

To perform the comparison 1110, the divergent video classification system 102 utilizes a loss function and determines a measure of loss between the predicted topic divergence classification 1106 and the ground truth topic divergence classification 1112. For example, the divergent video classification system 102 utilizes a hybrid loss function that includes a first term for a first measure of loss if the predicted topic divergence classification 1106 is within a particular threshold value of the ground truth topic divergence classification 1112 and a second term for a second measure of loss if the predicted topic divergence classification 1106 is not within the threshold value. In some embodiments, the divergent video classification system 102 utilizes a hybrid loss function represented by:

$$\mathcal{L}_{mix} = \begin{cases} \frac{1}{2}(l'' - FF(V))^2 & \text{if } |l'' - FF(V)| \leq \delta \\ \delta|l'' - FF(V)| - \frac{1}{2}\delta^2 & \text{otherwise} \end{cases}$$

where $\mathcal{L}_{mix}$ is, FF(V) is the predicted topic divergence classification 1106 (e.g., predicted from word vectors V via a feed-forward layer FF of the topic-specific knowledge encoder neural network 1104), δ is a threshold hyperparameter (e.g., a threshold value between predicted and ground truth), and l" is the ground truth topic divergence classification 1112 for the hybrid transcript 1102 (D").

As further illustrated in FIG. 11, the divergent video classification system 102 performs a back propagation 1114. Indeed, the divergent video classification system 102 back propagates to modify parameters (e.g., weights and biases) of the topic-specific knowledge encoder neural network 1104 to reduce the measure of loss determined via the comparison 1110 (e.g., via the hybrid loss function). Additionally, the divergent video classification system 102 repeats the process illustrated in FIG. 11 until the measure of loss satisfies a threshold loss.

Though slightly different, the divergent video classification system 102 implements a similar process to that illustrated in FIG. 11 to learn parameters based on a synthetic transcript. Indeed, as described above, the divergent video classification system 102 generates a predicted topic divergence classification from a synthetic transcript utilizing the topic-specific knowledge encoder neural network 1104. In some cases, as described above, the divergent video classification system 102 generates a binary prediction (e.g., topic divergent or topic conforming) for a topic divergence classification from a synthetic transcript.

In addition, the divergent video classification system 102 compares the predicted topic divergence classification with a ground truth topic divergence classification which indicates which of the binary classifications actually corresponds to the initial synthetic transcript. Indeed, the divergent video classification system 102 utilizes a synthetic loss function to determine a measure of loss between the precited topic divergence classification and the ground truth topic divergence classification. For example, the divergent video classification system 102 utilizes a synthetic loss function given by the following:

$$\mathcal{L}_{synth} = -\log(P(l'|D'))$$

where $\mathcal{L}_{synth}$ represents the synthetic loss, l' represents the ground truth topic divergence classification for the synthetic transcript D'.

In certain embodiments, the divergent video classification system 102 utilizes both hybrid transcripts and synthetic transcripts to train the topic-specific knowledge encoder neural network 1104. In particular, the divergent video classification system 102 adds hybrid transcripts and synthetic transcripts to a modified dataset and utilizes the modified dataset to learn parameters of the topic-specific knowledge encoder neural network 1104. In these embodiments, the divergent video classification system 102 utilizes a combined loss function given by:

$$\mathcal{L}_{total} = \mathcal{L}_{synth} + \mathcal{L}_{mix}$$

where $\mathcal{L}_{synth}$ and $\mathcal{L}_{mix}$ are defined above. The divergent video classification system 102 further modifies parameters of the topic-specific knowledge encoder neural network 1104 to reduce the combined loss over multiple iterations.

As mentioned above, the divergent video classification system 102 can provide accuracy improvements over prior digital video analysis systems. Indeed, by utilizing the topic-specific knowledge encoder neural network and by training the topic-specific knowledge encoder neural network using customized data including synthetic transcripts and hybrid transcripts, the divergent video classification system 102 can achieve accuracy metrics beyond those of conventional systems. To illustrate, experimenters have performed tests to compare example embodiments of the divergent video classification system 102 with alternate systems.

For the tests, experimenters determined an F1 score (e.g., a score that reflects a balance between precision and recall) for three different models: a random selection system, an existing classifier system, and an example implementation of the divergent video classification system 102. More specifically, the random selection system randomly selects a label (e.g., a topic divergence classification) for every document in a test set. The existing classifier system encodes an input document D using a one-layer LSTM and employs a feed-forward layer to generate a binary prediction for each input document. Using these models alongside the divergent video classification system 102, the experimenters generated predictions and measured results across the Behance® dataset including transcripts of 6,003 5-minute digital videos (approximately 500 hours of digital video) streamed on the Behance® social network. The table below illustrates results of the experiment.

| Model | F1 Score |
| --- | --- |
| Random Selection | 19.02 |
| Existing Classifier | 64.28 |
| Divergent Video Classification System | 67.12 |

As illustrated in the above table, the experimenters demonstrated that the divergent video classification system 102 outperforms both alternate systems. Indeed, the divergent video classification system 102 exhibits an F1 score of 67.12 across the tested dataset, while the random selection system has an F1 score of 19.02 and the existing classifier system has an F1 score of 64.28.

Figure 12:
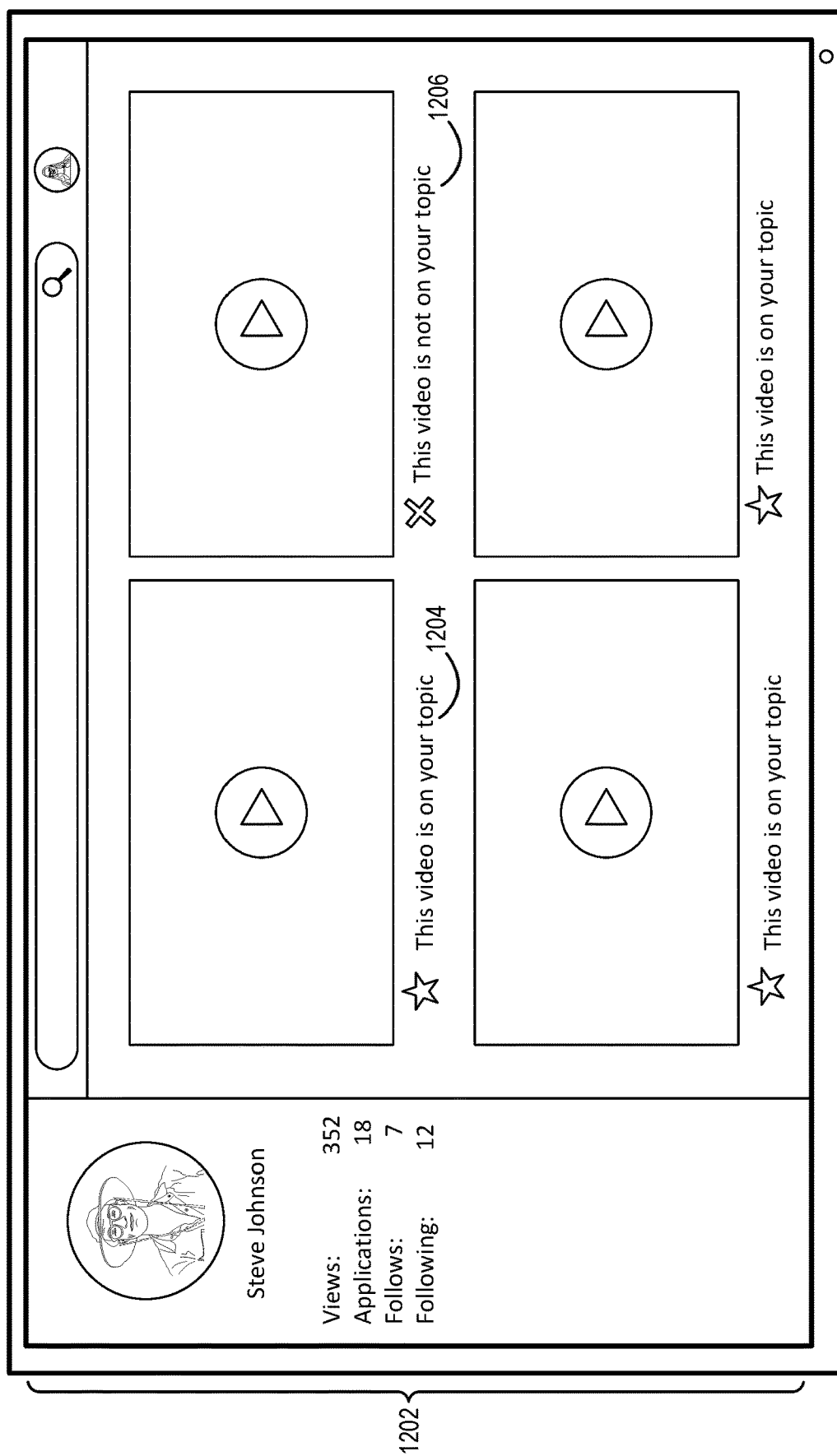
FIG. 12 illustrates an example digital video search interface in accordance with one or more embodiments.

As mentioned above, in certain described embodiments, the divergent video classification system 102 provides a notification of a topic divergence classification for display. In particular, the divergent video classification system 102 provides a notification indicating or reflecting one or more topic divergence classifications for respective digital videos as part of a search result or while a user is navigating through digital videos. FIG. 12 illustrates a digital video search interface including topic divergence classifications in accordance with one or more embodiments.

As illustrated in FIG. 12, the client device 108 displays a digital video search interface 1202. For example, the divergent video classification system 102 receives a search query that indicates a target topic or else receives navigation input to a particular web page relating to a target topic. In addition, the divergent video classification system 102 identifies or selects digital videos to provide as part of a search result for the search query or within the web page navigated to by the client device 108. Further, the divergent video classification system 102 generates topic divergence classifications for the digital videos in relation to the target topic.

As shown, the divergent video classification system 102 generates and provides for display the notification 1204 and the notification 1206. The notification 1204 indicates that the digital video immediately above the notification 1204 is related to the target topic ("This video is on your topic"), while the notification 1206 indicates that the digital video immediately above the notification 1206 is not related to the target topic ("This video is not on your topic"). Thus, the divergent video classification system 102 provides the notification 1204 in response to generating a topic divergence classification of topic conforming for the first digital video and provides the notification 1206 in response to generating a topic divergence classification of topic divergent for the second digital video.

Figure 13:
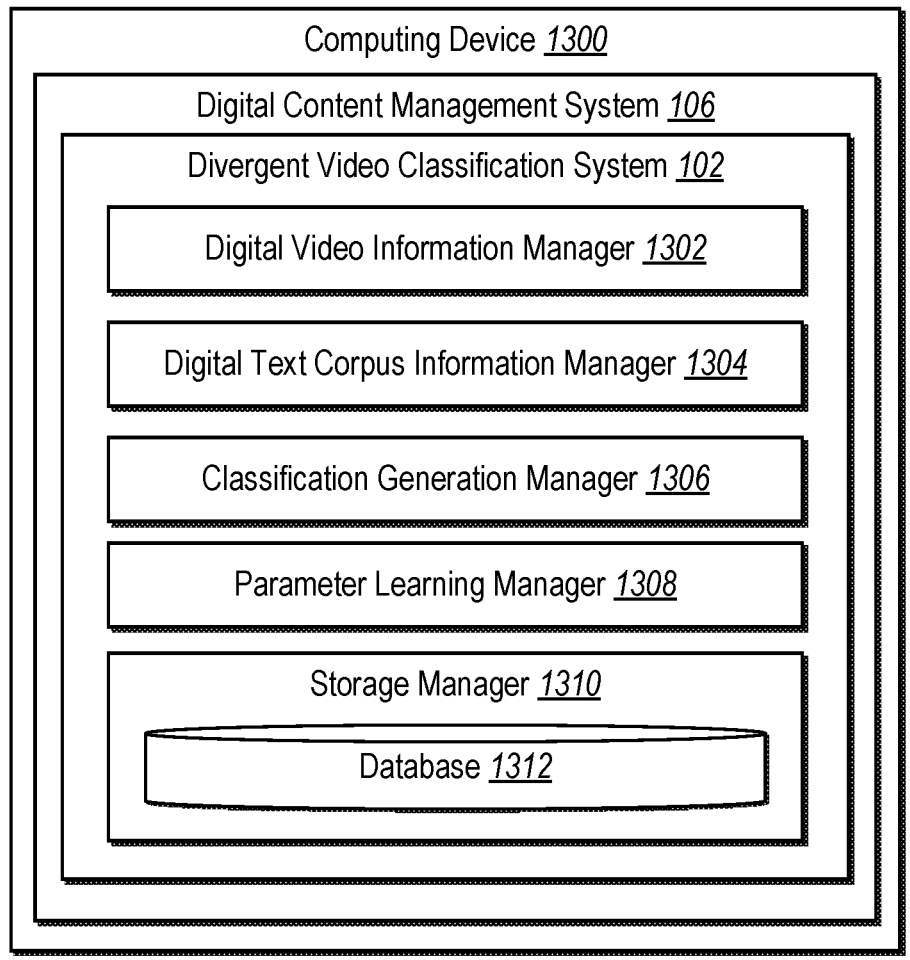
FIG. 13 illustrates a schematic diagram of a divergent video classification system in accordance with one or more embodiments.

Looking now to FIG. 13, additional detail will be provided regarding components and capabilities of the divergent video classification system 102. Specifically, FIG. 13 illustrates an example schematic diagram of the divergent video classification system 102 on an example computing device 1300 (e.g., one or more of the client device 108 and/or the server(s) 104). In some embodiments, the computing device 1300 refers to a distributed computing system where different managers are located on different devices, as described above. As shown in FIG. 13, the divergent video classification system 102 includes a digital video information manager 1302, a digital text corpus information manager 1304, a classification generation manager 1306, a parameter learning manager 1308, and a storage manager 1310.

As just mentioned, the divergent video classification system 102 includes a digital video information manager 1302. In particular, the digital video information manager 1302 manages, maintains, extracts, detects, determines, or identifies information from digital videos such as text or words. For example, the digital video information manager 1302 determines words used in a digital video by accessing or generating a transcript for the digital video. In addition, the digital video information manager 1302 generates contextualized feature vectors for the words of the digital video according to the disclosure herein.

As illustrated in FIG. 13, the divergent video classification system 102 includes a digital text corpus information manager 1304. In particular, the digital text corpus information manager 1304 manages, maintains, generates, gathers, collects, arranges, detects, determines, selects, or identifies digital content to include within a digital text corpus. For example, the digital text corpus information manager 1304 generates a digital text corpus for a particular target topic by accessing tutorials known to relate to the target topic, digital content editing tool names corresponding to the target topic, and/or keywords from a topic ontology relating to the target topic. In addition, the digital text corpus information manager 1304 generates corpus embeddings from words in a digital text corpus in accordance with the disclosure herein.

As further illustrated in FIG. 13, the divergent video classification system 102 includes a classification generation manager 1306. In particular, the classification generation manager 1306 manages, maintains, determines, generates, produces, predicts, or identifies topic divergence classifications for digital videos. For example, as described herein, the classification generation manager 1306 compares words of a digital video with words of a digital text corpus to generate a topic divergence classification. Specifically, the classification generation manager 1306 compares contextualized feature vectors from a digital video and corpus embeddings from a digital text corpus to generate a topic divergence classification utilizing a topic-specific knowledge encoder neural network.

Additionally, as shown in FIG. 13, the divergent video classification system 102 includes a parameter learning manager 1308. In particular, the parameter learning manager 1308 manages, maintains, determines, learns, trains, or tunes parameters such as weights and biases of a topic-specific knowledge encoder neural network. For example, the parameter learning manager 1308 generates synthetic transcripts and/or hybrid transcripts to include within a modified dataset. The parameter learning manager 1308 further utilizes the modified dataset to train or tune the topic-specific knowledge encoder neural network to learn its parameters as described herein.

The divergent video classification system 102 further includes a storage manager 1310. The storage manager 1310 operates in conjunction with, or includes, one or more memory devices such as the database 1312 (e.g., the database 112) that store various data such as a topic-specific knowledge encoder neural network, digital videos, and digital text corpuses.

In one or more embodiments, each of the components of the divergent video classification system 102 are in communication with one another using any suitable communication technologies. Additionally, the components of the divergent video classification system 102 is in communication with one or more other devices including one or more client devices described above. It will be recognized that although the components of the divergent video classification system 102 are shown to be separate in FIG. 13, any of the subcomponents may be combined into fewer components, such as into a single component, or divided into more components as may serve a particular implementation. Furthermore, although the components of FIG. 13 are described in connection with the divergent video classification system 102, at least some of the components for performing operations in conjunction with the divergent video classification system 102 described herein may be implemented on other devices within the environment.

The components of the divergent video classification system 102 can include software, hardware, or both. For example, the components of the divergent video classification system 102 can include one or more instructions stored on a computer-readable storage medium and executable by processors of one or more computing devices (e.g., the computing device 1300). When executed by the one or more processors, the computer-executable instructions of the divergent video classification system 102 can cause the computing device 1300 to perform the methods described herein. Alternatively, the components of the divergent video classification system 102 can comprise hardware, such as a special purpose processing device to perform a certain function or group of functions. Additionally, or alternatively, the components of the divergent video classification system 102 can include a combination of computer-executable instructions and hardware.

Furthermore, the components of the divergent video classification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the divergent video classification system 102 may be implemented as part of a stand-alone application on a personal computing device or a mobile device. Alternatively, or additionally, the components of the divergent video classification system 102 may be implemented in any application that allows creation and delivery of marketing content to users, including, but not limited to, applications in ADOBE® EXPERIENCE MANAGER and CREATIVE CLOUD®, such as ADOBE BEHANCE®, ADOBE PREMIERE®, and INDESIGN®. "ADOBE," "ADOBE EXPERIENCE MANAGER," "CREATIVE CLOUD," "BEHANCE," "ADOBE PREMIERE," and "INDESIGN" are either registered trademarks or trademarks of Adobe Inc. in the United States and/or other countries.

FIGS. 1-13 the corresponding text, and the examples provide a number of different systems, methods, and non-transitory computer readable media for a neural network approach for generating topic divergence classifications for digital videos based on words from the digital videos and further based on a digital text corpus representing a target topic. In addition to the foregoing, embodiments can also be described in terms of flowcharts comprising acts for accomplishing a particular result. For example, FIGS. 14-15 illustrate flowcharts of example sequences or series of acts in accordance with one or more embodiments.

Figure 14:
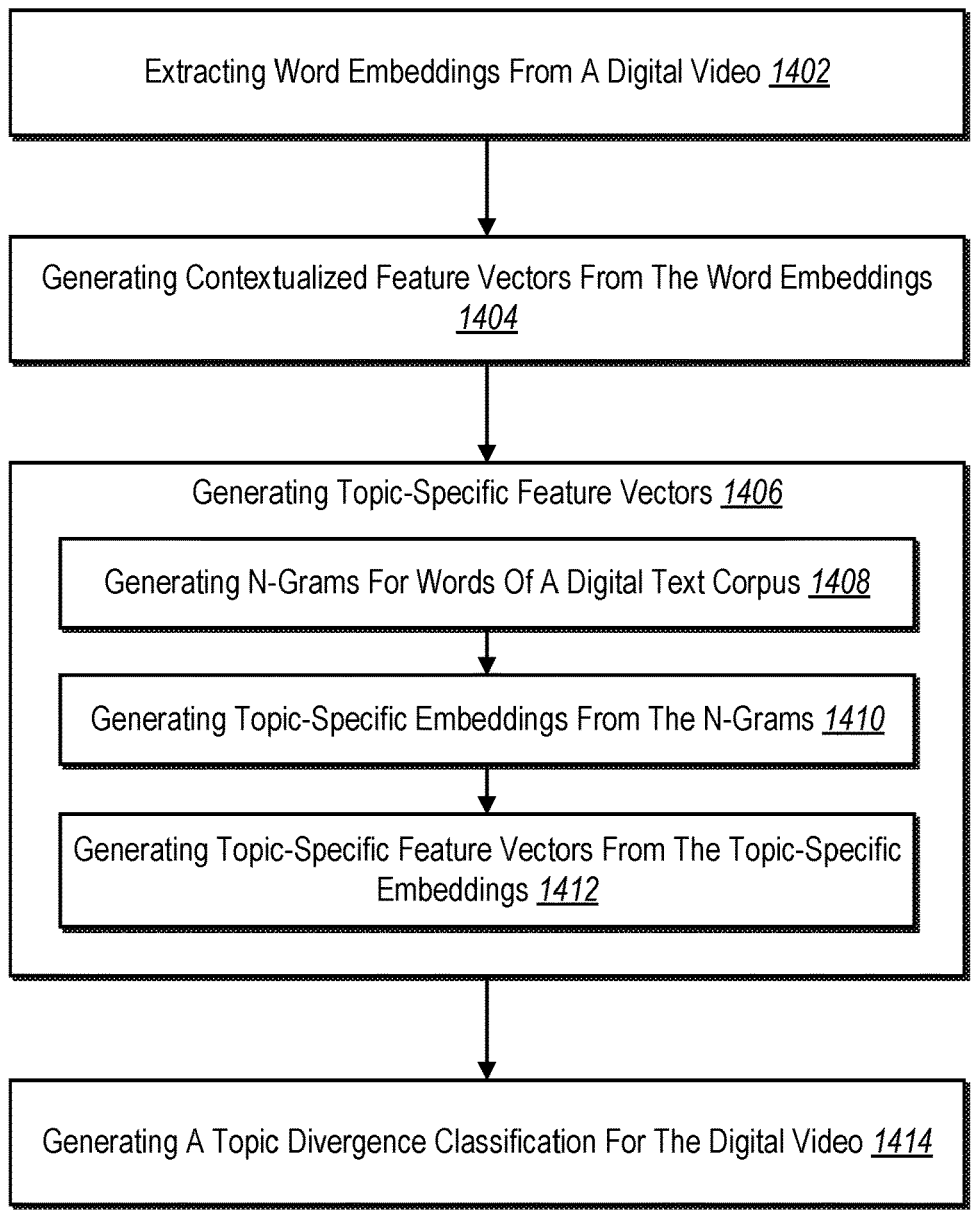
FIG. 14 illustrates a flowchart of a series of acts for a neural network approach for generating topic divergence classifications for digital videos based on words from the digital videos and further based on a digital text corpus representing a target topic in accordance with one or more embodiments.
Figure 15:
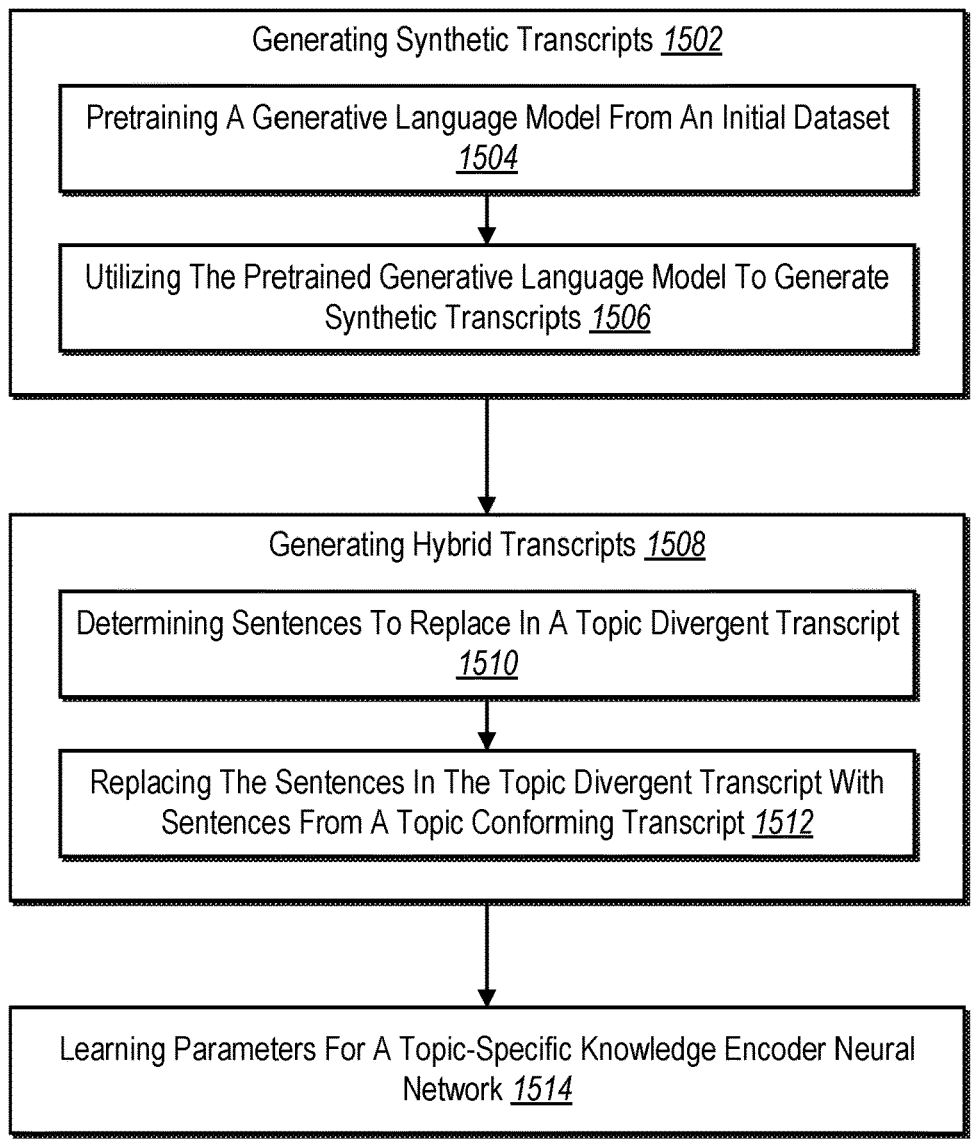
FIG. 15 illustrates a flowchart of a series of acts for learning parameters of a topic-specific knowledge encoder neural network in accordance with one or more embodiments.

While FIGS. 14-15 illustrate acts according to particular embodiments, alternative embodiments may omit, add to, reorder, and/or modify any of the acts shown in FIGS. 14-15. The acts of FIGS. 14-15 can be performed as part of a method. Alternatively, a non-transitory computer readable medium can comprise instructions, that when executed by one or more processors, cause a computing device to perform the acts of FIGS. 14-15. In still further embodiments, a system can perform the acts of FIGS. 14-15. Additionally, the acts described herein may be repeated or performed in parallel with one another or in parallel with different instances of the same or other similar acts.

FIG. 14 illustrates an example series of acts 1400 for a neural network approach for generating topic divergence classifications for digital videos based on words from the digital videos and further based on a digital text corpus representing a target topic. In particular, the series of acts 1400 includes an act 1402 of extracting word embeddings from a digital video. For example, the act 1402 involves extracting word embeddings from words of a digital video utilizing a word embedding model.

In addition, the series of acts 1400 includes an act 1404 of generating contextualized feature vectors from the word embeddings. In particular, the act 1404 involves generating contextualized feature vectors from the word embeddings utilizing a first long short-term memory ("LSTM") layer. Indeed, the act 1404 sometimes involves generating, utilizing the first LSTM layer, contextualized feature vectors from words used within the digital video. For example, the act 1404 involves extracting word embeddings from the words used within the digital video utilizing a word embedding model and determining hidden states generated from the word embeddings utilizing the first LSTM layer.

As further illustrated in FIG. 14, the series of acts 1400 includes an act 1406 of generating topic-specific feature vectors. In particular, the act 1406 involves generate topic-specific feature vectors from a digital text corpus associated with a target topic for the digital video utilizing a second LSTM layer. For example, the act 1406 includes one or more constituent acts such as the act 1408 of generating n-grams for words of a digital text corpus. Indeed, the act 1408 involves determining n-grams from the words of the digital text corpus.

In addition, the act 1406 includes an act 1410 of generating topic-specific embeddings from the n-grams. In particular, the act 1410 involves generating topic-specific embeddings for the target topic by comparing the contextualized feature vectors with words from the digital text corpus. In some cases, the act 1410 involves extracting corpus embeddings from the n-grams associated with the words of the digital text corpus and selecting, for a particular word within the digital video, a subset of the corpus embeddings as topic-specific embeddings associated with the particular word. For instance, the act 1410 involves selecting the subset of the corpus embeddings by determining similarity scores for the corpus embeddings representing similarities of the corpus embeddings in relation to a contextualized feature vector associated with the particular word and selecting, according to the similarity scores, one or more corpus embeddings with similarity scores that satisfy a similarity threshold to include within the subset of the corpus embeddings for the particular word. Indeed, in some embodiments the act 1410 involves generating topic-specific feature vectors utilizing the second LSTM layer from the topic-specific embeddings.

In some embodiments, the act 1410 involves generating the topic-specific embeddings by extracting a plurality of corpus embeddings from the words of the digital text corpus, determining similarity scores for a plurality of corpus embeddings in relation to a contextualized feature vector associated with a particular word used in the digital video, and selecting, as topic-specific embeddings for the particular word, a subset of the plurality of corpus embeddings with similarity scores that satisfy a similarity threshold. Indeed, the act 1410 can involve determining a plurality of n-grams associated with the words from the digital text corpus and extracting the plurality of corpus embeddings from the plurality of n-grams associated with the words from the digital text corpus.

Further, the act 1406 includes an act 1412 of generating topic-specific feature vectors from the topic-specific embeddings. In particular, the act 1412 involves generating the topic-specific feature vectors from the topic-specific embeddings utilizing the second LSTM layer. For example, the act 1412 involves generating the topic-specific feature vectors in a sequential order defined by the words of the digital video utilizing the second LSTM layer. In some embodiments, the series of acts 1400 (e.g., as part of the act 1412) includes an act of generating a topic-specific knowledge pool for a word of the digital video by selecting, from among the topic-specific embeddings for the target topic, a subset of the topic-specific embeddings associated with a word from the digital video and max-pooling the subset of the topic-specific embeddings selected for the word. In some embodiments, the act 1412 involves generating a separate topic-specific feature vector for each word used within the digital video.

In some cases, the series of acts 1400 includes acts of combining the topic-specific feature vectors and the contextualized feature vectors into concatenated feature vectors, generating word feature vectors from the concatenated feature vectors utilizing a first feed-forward layer of the topic divergence classification layer, and generating the topic divergence classification by generating a probability distribution from the word feature vectors utilizing a second feed-forward layer of the topic divergence classification layer.

Additionally, the series of acts 1400 includes an act 1414 of generating a topic divergence classification for the digital video. In particular, the act 1414 involves generating a topic divergence classification for the digital video, utilizing a topic-specific knowledge encoder neural network, from the contextualized feature vectors from the word embeddings and the topic-specific feature vectors from the digital text corpus. For example, the act 1414 involves generating the topic divergence classification by utilizing the topic-specific knowledge encoder neural network to determine a probability that the digital video diverges from the target topic for the digital video. In some cases, the act 1414 involves generating, utilizing the topic divergence classification layer, a topic divergence classification for the digital video from the topic-specific feature vectors and the contextualized feature vectors. In certain embodiments, the act 1414 involves classifying the digital video as a topic divergent video indicating that the digital video diverges from the target topic.

FIG. 15 illustrates an example series of acts 1500 for learning parameters of a topic-specific knowledge encoder neural network. For example, the series of acts 1500 includes an act 1502 of generating synthetic transcripts. In particular, the act 1502 involves generating a plurality of synthetic transcripts utilizing a generative language model comprising parameters tuned from transcripts of topic divergent videos. In some cases, the act 1502 includes additional acts such as the act 1504 of pretraining a generative language model from an initial dataset and the act 1506 of utilizing the pretrained generative language model to generate synthetic transcripts. In some embodiments, the act 1506 involves determining, utilizing the generative language model, probabilities for words belonging at respective time steps of the plurality of synthetic transcripts and selecting words to add to the plurality of synthetic transcripts according to the probabilities at the respective time steps until a termination criterion is satisfied.

In certain embodiments, the series of acts 1500 includes acts of generating topic divergence classifications for the plurality of synthetic transcripts utilizing the topic-specific knowledge encoder neural network and selecting, to include within a sample dataset for learning the parameters of the topic-specific knowledge encoder neural network, one or more of the plurality of synthetic transcripts with topic divergence classifications indicating divergence from a target topic.

As illustrated in FIG. 15, the series of acts 1500 includes an act 1508 generating hybrid transcripts. In particular, the act 1508 involves generating hybrid transcripts by combining one or more transcripts of topic divergent videos with one or more transcripts of topic conforming videos. In some embodiments, the act 1508 includes additional acts such as the act 1510 of determining sentences to replace in a topic divergent transcript and the act 1512 of replacing the sentences in the topic divergent transcript with sentences from a topic conforming transcript.

As further illustrated in FIG. 15, the series of acts 1500 includes an act 1514 of learning parameters for a topic-specific knowledge encoder neural network. In particular, the act 1514 involves learning parameters for a topic-specific knowledge encoder neural network utilizing the synthetic transcripts and the hybrid transcripts. In some cases, the act 1514 involves assigning a ground truth topic divergence classification to a hybrid transcript according to a percentage of sentences replaced with topic sentences from a transcript of a topic conforming video, generating a predicted topic divergence classification for the hybrid transcript utilizing the topic-specific knowledge encoder neural network, and comparing the predicted topic divergence classification with the ground truth topic divergence classification. In these or other embodiments, the act 1514 involves utilizing a combined loss function comprising a synthetic loss function associated with the synthetic transcripts and a hybrid loss function associated with the hybrid transcripts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
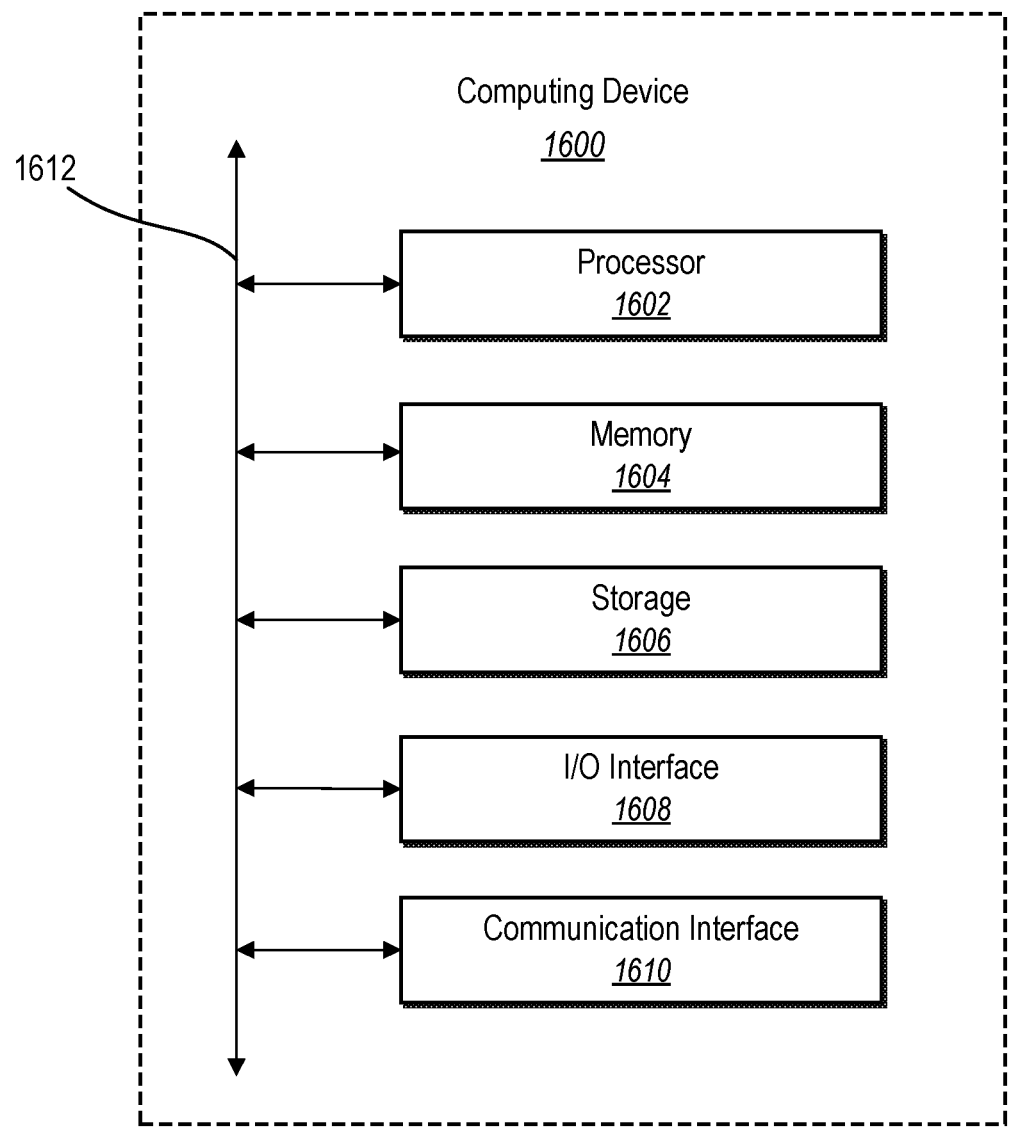
FIG. 16 illustrates a block diagram of an example computing device in accordance with one or more embodiments.

FIG. 16 illustrates, in block diagram form, an example computing device 1600 (e.g., the computing device 1300, the client device 108, and/or the server(s) 104) that may be configured to perform one or more of the processes described above. One will appreciate that the divergent video classification system 102 can comprise implementations of the computing device 1600. As shown by FIG. 16, the computing device can comprise a processor 1602, memory 1604, a storage device 1606, an I/O interface 1608, and a communication interface 1610. Furthermore, the computing device 1600 can include an input device such as a touchscreen, mouse, keyboard, etc. In certain embodiments, the computing device 1600 can include fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, storage device 1606 can comprise a non-transitory storage medium described above. The storage device 1606 may include a hard disk drive (HDD), flash memory, a Universal Serial Bus (USB) drive or a combination of these or other storage devices.

The computing device 1600 also includes one or more input or output ("I/O") devices/interfaces 1608, which are provided to allow a user to provide input to (such as user strokes), receive output from, and otherwise transfer data to and from the computing device 1600. These I/O devices/interfaces 1608 may include a mouse, keypad or a keyboard, a touch screen, camera, optical scanner, network interface, modem, other known I/O devices or a combination of such I/O devices/interfaces 1608. The touch screen may be activated with a writing device or a finger.

The I/O devices/interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1608 is configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 can provide one or more interfaces for communication (such as, for example, packet-based communication) between the computing device and one or more other computing devices 1600 or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can comprise hardware, software, or both that couples components of computing device 1600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
    extract word embeddings from words of a digital video utilizing a word embedding model;
    generate contextualized feature vectors from the word embeddings utilizing a first long short-term memory ("LSTM") layer;
    generate topic-specific embeddings for a target topic of the digital video by comparing the contextualized feature vectors with words from a digital text corpus associated with the target topic;
    generate topic-specific feature vectors from the topic-specific embeddings utilizing a second LSTM layer; and
    generate a topic divergence classification for the digital video, utilizing a topic-specific knowledge encoder neural network, from the contextualized feature vectors from the word embeddings and the topic-specific feature vectors from the digital text corpus.

2. The non-transitory computer readable medium of claim 1, further comprising instructions that, when executed by the at least one processor, cause the computing device to provide the topic divergence classification for display on a client device.

3. The non-transitory computer readable medium of claim 1, further comprising instructions that, when executed by the at least one processor, cause the computing device to generate the topic-specific embeddings for the target topic by:
    determining n-grams from the words of the digital text corpus;
    extracting corpus embeddings from the n-grams associated with the words of the digital text corpus; and
    selecting, for a particular word within the digital video, a subset of the corpus embeddings as topic-specific embeddings associated with the particular word.

4. The non-transitory computer readable medium of claim 3, further comprising instructions that, when executed by the at least one processor, cause the computing device to select the subset of the corpus embeddings by:
    determining similarity scores for the corpus embeddings representing similarities of the corpus embeddings in relation to a contextualized feature vector associated with the particular word; and
    selecting, according to the similarity scores, one or more corpus embeddings with similarity scores that satisfy a similarity threshold to include within the subset of the corpus embeddings for the particular word.

5. The non-transitory computer readable medium of claim 1, further comprising instructions that, when executed by the at least one processor, cause the computing device to generate a topic-specific knowledge pool for a word of the digital video by:

selecting, from among the topic-specific embeddings for the target topic, a subset of the topic-specific embeddings associated with a word from the digital video; and max-pooling the subset of the topic-specific embeddings selected for the word.

6. The non-transitory computer readable medium of claim 1, further comprising instructions that, when executed by the at least one processor, cause the computing device to generate the topic-specific feature vectors in a sequential order defined by the words of the digital video utilizing the second LSTM layer.

7. The non-transitory computer readable medium of claim 1, further comprising instructions that, when executed by the at least one processor, cause the computing device to generate the topic divergence classification by utilizing the topic-specific knowledge encoder neural network to determine a probability that the digital video diverges from the target topic for the digital video.

8. A system comprising:
one or more memory devices comprising a digital video; a digital text corpus associated with a target topic for the digital video; and a topic-specific knowledge encoder neural network comprising a first LSTM layer, a second LSTM layer, and a topic divergence classification layer; and
one or more computing devices that are configured to cause the system to:
generate, utilizing the first LSTM layer, contextualized feature vectors from words used within the digital video;
generate topic-specific embeddings by comparing the contextualized feature vectors with words from the digital text corpus;
generate topic-specific feature vectors utilizing the second LSTM layer from the topic-specific embeddings; and
generate, utilizing the topic divergence classification layer, a topic divergence classification for the digital video from the topic-specific feature vectors and the contextualized feature vectors.

9. The system of claim 8, wherein the one or more computing devices are further configured to cause the system to generate the contextualized feature vectors by:
extracting word embeddings from the words used within the digital video utilizing a word embedding model; and
determining hidden states generated from the word embeddings utilizing the first LSTM layer.

10. The system of claim 8, wherein the one or more computing devices are further configured to cause the system to generate the topic-specific embeddings by:
extracting a plurality of corpus embeddings from the words of the digital text corpus;
determining similarity scores for a plurality of corpus embeddings in relation to a contextualized feature vector associated with a particular word used in the digital video; and
selecting, as topic-specific embeddings for the particular word, a subset of the plurality of corpus embeddings with similarity scores that satisfy a similarity threshold.

11. The system of claim 10, wherein the one or more computing devices are further configured to cause the system to:
determine a plurality of n-grams associated with the words from the digital text corpus; and extract the plurality of corpus embeddings from the plurality of n-grams associated with the words from the digital text corpus.

12. The system of claim 8, wherein the one or more computing devices are further configured to cause the system to:
combine the topic-specific feature vectors and the contextualized feature vectors into concatenated feature vectors;
generate word feature vectors from the concatenated feature vectors utilizing a first feed-forward layer of the topic divergence classification layer; and
generate the topic divergence classification by generating a probability distribution from the word feature vectors utilizing a second feed-forward layer of the topic divergence classification layer.

13. The system of claim 8, wherein the one or more computing devices are further configured to cause the system to generate the topic-specific feature vectors by generating a separate topic-specific feature vector for each word used within the digital video.

14. The system of claim 8, wherein the one or more computing devices are further configured to cause the system to generate the topic divergence classification by classifying the digital video as a topic divergent video indicating that the digital video diverges from the target topic.

15. A computer-implemented method comprising:
generating a plurality of synthetic transcripts utilizing a generative language model comprising parameters tuned from transcripts of topic divergent videos;
generating hybrid transcripts by combining one or more transcripts of topic divergent videos with one or more transcripts of topic conforming videos to replace a sentence from the one or more transcripts of topic divergent videos with a sentence from the one or more transcripts of topic conforming videos; and
learning parameters for a topic-specific knowledge encoder neural network utilizing the plurality of synthetic transcripts and the hybrid transcripts.

16. The computer-implemented method of claim 15, further comprising:
generating topic divergence classifications for the plurality of synthetic transcripts utilizing the topic-specific knowledge encoder neural network; and
selecting, to include within a sample dataset for learning the parameters of the topic-specific knowledge encoder neural network, one or more of the plurality of synthetic transcripts with topic divergence classifications indicating divergence from a target topic.

17. The computer-implemented method of claim 15, wherein generating the plurality of synthetic transcripts comprises:
determining, utilizing the generative language model, probabilities for words belonging at respective time steps of the plurality of synthetic transcripts; and
selecting words to add to the plurality of synthetic transcripts according to the probabilities at the respective time steps until a termination criterion is satisfied.

18. The computer-implemented method of claim 15, wherein generating the hybrid transcripts comprises replacing a percentage of sentences from transcripts of topic divergent videos with a corresponding number of sentences from transcripts of topic conforming videos.

19. The computer-implemented method of claim 15, wherein learning the parameters for the topic-specific knowledge encoder neural network comprises:

assigning a ground truth topic divergence classification to a hybrid transcript according to a percentage of sentences replaced with topic sentences from a transcript of a topic conforming video;

generating a predicted topic divergence classification for the hybrid transcript utilizing the topic-specific knowledge encoder neural network; and comparing the predicted topic divergence classification with the ground truth topic divergence classification.

20. The computer-implemented method of claim 15, wherein learning the parameters for the topic-specific knowledge encoder neural network comprises utilizing a combined loss function comprising a synthetic loss function associated with the plurality of synthetic transcripts and a hybrid loss function associated with the hybrid transcripts.

* * * * *